United States Patent
Pomerance et al.

(10) Patent No.: US 11,841,983 B2
(45) Date of Patent: Dec. 12, 2023

(54) SYSTEMS AND METHODS USING HYBRID BOOLEAN NETWORKS AS PHYSICALLY UNCLONABLE FUNCTIONS

(71) Applicants: Ohio State Innovation Foundation, Columbus, OH (US); Andrew Joseph Pomerance, Alexandria, VA (US)

(72) Inventors: Andrew Joseph Pomerance, Alexandria, VA (US); Daniel Gauthier, Hilliard, OH (US); Daniel Canaday, Columbus, OH (US); Noeloikeau Charlot, Kailua, HI (US)

(73) Assignee: Ohio State Innovation Foundation, Columbus, OH (US)

( * ) Notice: Subject to any disclaimer, the term of this patent is extended or adjusted under 35 U.S.C. 154(b) by 176 days.

(21) Appl. No.: 17/616,964

(22) PCT Filed: Apr. 7, 2020

(86) PCT No.: PCT/US2020/027072
§ 371 (c)(1),
(2) Date: Dec. 6, 2021

(87) PCT Pub. No.: WO2020/247059
PCT Pub. Date: Dec. 10, 2020

(65) Prior Publication Data
US 2022/0318437 A1    Oct. 6, 2022

Related U.S. Application Data

(60) Provisional application No. 62/906,244, filed on Sep. 26, 2019, provisional application No. 62/858,542, filed on Jun. 7, 2019.

(51) Int. Cl.
*G06F 21/76* (2013.01)
*G06F 7/58* (2006.01)

(52) U.S. Cl.
CPC .................................. *G06F 21/76* (2013.01)

(58) Field of Classification Search
CPC ........... G06F 21/76; G06F 7/588; G09C 1/00; H04L 9/001; H04L 9/3278
See application file for complete search history.

(56) References Cited

U.S. PATENT DOCUMENTS

| | | | |
|---|---|---|---|
| 10,732,971 B1 | 8/2020 | Pomerance | |
| 2008/0279373 A1* | 11/2008 | Erhart | H04L 9/3249 714/E11.017 |

(Continued)

FOREIGN PATENT DOCUMENTS

EP    3036621 A1    10/2017

OTHER PUBLICATIONS

International Search Report and Written Opinion, issued in PCT Application No. PCT/US2020/027072 dated Aug. 7, 2020. 11 pages.

(Continued)

*Primary Examiner* — Gary S Gracia
(74) *Attorney, Agent, or Firm* — Meunier Carlin & Curfman LLC

(57) ABSTRACT

Systems, devices, and methods for generating a unique fingerprint are described herein. For example, an example integrated circuit (IC) chip includes a physically unclonable function (PUF) and an auxiliary circuit. The PUF is a hybrid Boolean network. Additionally, the auxiliary circuit is configured to receive a transient response enable signal.

15 Claims, 17 Drawing Sheets

(56) References Cited

U.S. PATENT DOCUMENTS

| | | | |
|---|---|---|---|
| 2011/0299678 A1* | 12/2011 | Deas .................... | H04L 9/003 380/28 |
| 2013/0293274 A1* | 11/2013 | Shimizu ................ | H03K 3/02 327/225 |
| 2014/0268994 A1* | 9/2014 | Rose ..................... | G06F 21/73 365/148 |
| 2015/0234751 A1* | 8/2015 | Van Der Sluis .... | G06F 12/1408 713/193 |
| 2018/0166400 A1* | 6/2018 | Wang ................... | H04L 9/3278 |
| 2018/0183589 A1* | 6/2018 | Danger ................ | H04L 9/0877 |
| 2018/0183614 A1* | 6/2018 | Danger ................ | H04L 9/0866 |
| 2018/0198447 A1* | 7/2018 | Rice ..................... | H03K 19/003 |
| 2018/0241557 A1* | 8/2018 | Maes .................... | H04L 9/0866 |
| 2019/0156066 A1* | 5/2019 | Foster .................. | G06F 21/72 |
| 2019/0221139 A1* | 7/2019 | Schrijen ............... | H04L 9/0866 |
| 2019/0305942 A1* | 10/2019 | Cambou ............... | H04L 9/0852 |
| 2019/0305973 A1* | 10/2019 | Dewan ................. | H04L 9/3247 |
| 2019/0347447 A1* | 11/2019 | Tomita ................. | H01L 23/576 |
| 2019/0349207 A1* | 11/2019 | Merchan .............. | H04L 9/3242 |
| 2019/0349208 A1* | 11/2019 | Merchan .............. | H04L 9/3278 |
| 2019/0354672 A1* | 11/2019 | Cambou ............... | H04L 9/3236 |
| 2020/0050430 A1* | 2/2020 | Näslund ............... | G06F 7/588 |
| 2020/0213140 A1* | 7/2020 | Cambou ............... | H04L 9/3278 |
| 2020/0295954 A1* | 9/2020 | Cambou ............... | H04L 9/0866 |
| 2020/0322144 A1* | 10/2020 | Mossayebi ........... | H01L 33/06 |
| 2020/0356085 A1* | 11/2020 | Wentz .................. | H04L 9/0866 |
| 2021/0004461 A1* | 1/2021 | Guilley ................. | H01L 23/576 |
| 2021/0135887 A1* | 5/2021 | Plusquellic ........... | H04L 9/3278 |
| 2022/0067140 A1* | 3/2022 | Cambou ............... | G06F 21/45 |
| 2022/0094561 A1* | 3/2022 | Zhang .................. | H04L 9/3278 |
| 2022/0164433 A1* | 5/2022 | Camilleri .............. | G09C 1/00 |
| 2022/0177911 A1* | 6/2022 | Zhu ...................... | C07K 14/4702 |
| 2022/0318437 A1* | 10/2022 | Pomerance ........... | H04L 9/3278 |
| 2022/0385486 A1* | 12/2022 | Chung .................. | G11C 7/065 |
| 2023/0045288 A1* | 2/2023 | Cambou ............... | H04L 9/14 |
| 2023/0096860 A1* | 3/2023 | Cambou ............... | H04L 9/3268 713/189 |
| 2023/0163980 A1* | 5/2023 | Cambou ............... | H04L 9/0869 713/165 |

OTHER PUBLICATIONS

Balyo, Tomáš, Marijn JH Heule, and Matti Järvisalo. "Proceedings of SAT Competition 2017: Solver and Benchmark Descriptions." (2017).

Barun Chandra, Howard Karloff, and Craig Tovey. New results on the old k-opt algorithm for the traveling salesman problem. SIAM Journal on Computing, 28(6):1998-2029, 1999.

Bellido-Diaz, M. J., et al. "Logical modelling of delay degradation effect in static CMOS gates." IEE Proceedings-Circuits, Devices and Systems 147.2 (2000): 107-117.

Cavalcante, Hugo LD de S., et al. "On the origin of chaos in autonomous Boolean networks." Philosophical Transactions of the Royal Society of London A: Mathematical, Physical and Engineering Sciences 368.1911 (2010): 495-513.

Chen, Qingqing, et al. "The bistable ring PUF: A new architecture for strong physical unclonable functions." Hardware-Oriented Security and Trust (HOST) 2011. IEEE, 2011.

Crawford, James M., and Larry D. Auton. "Experimental results on the crossover point in random 3-SAT." Artificial Intelligence 81.1-2 (1996): 31-57.

Daniel E Holcomb, Wayne P Burleson, and Kevin Fu. Power-up sram state as an identifying fingerprint and source of true random numbers. IEEE Transactions on Computers, 58(9):1198-1210, 2009.

David P Rosin, Damien Rontani, and Daniel J Gauthier. Ultrafast physical generation of random numbers using hybrid boolean networks. Physical Review E, 87(4):040902, 2013.

David P Rosin. Ultra-fast physical generation of random numbers using hybrid boolean networks. In Dynamics of Complex Autonomous Boolean Networks, pp. 57-79. Springer, 2015.

Delvaux, Jeroen, Dawu Gu, and Ingrid Verbauwhede. "Upper Bounds on The Min-Entropy of RO Sum, Arbiter, Feed-Forward Arbiter, and S-ArbRO PUFs." Hardware-Oriented Security and Trust (AsianHOST). IEEE, 2016.

Dodis, Yevgeniy, Leonid Reyzin, and Adam Smith. "Fuzzy extractors: How to generate strong keys from biometrics and other noisy data." International conference on the theory and applications of cryptographic techniques. Springer, Berlin, Heidelberg, 2004.

Frans MJ Willems, Yuri M Shtarkov, and Tjalling J Tjalkens. The contexttree weighting method: basic properties. IEEE Transactions on Information Theory, 41(3):653-664, 1995.

Ganji, D. Forte, and J. Seifert. PUFmeter a property testing tool for as-sessing the robustness of physically unclonable functions to machine learning attacks. *IEEE Access*, 7:122513-122521, 2019.

Gujja. Temperature Variation Effects on Asynchronous PUF Design Using FPGAs. University of Toledo, 2014.

http://de0-nano-soc.terasic.com/DE0-Nano-SoC Kit/Atlas-SoC Kit.

Jakob Jonsson and Burt Kaliski. Public-key cryptography standards (PKCS)# 1: RSA cryptography specifications version 2.1. Technical report, 2003.

Junqing Zhang, Trung Q Duong, Alan Marshall, and Roger Woods. Key generation from wireless channels: A review. IEEE Access, 4:614-626, 2016.

Keith B. Frikken, Marina Blanton, and Mikhail J. Atallah. Robust * using physically unclonable functions. In Pierangela Samarati, Moti Yung, Fabio Martinelli, and Claudio A. Ardagna, editors, Information Security, pp. 262-277, Berlin, Heidelberg, 2009. Springer Berlin Heidelberg.

Lawrence Bassham, Andrew Rukhin, Juan Soto, James Nechvatal, Miles Smid, Elaine Barker, Stefan Leigh, Mark Levenson, Mark Vangel, David Banks, N. Heckert, and James Dray. SP 800-22 Rev. 1a A Statistical Test Suite for Random and Pseudorandom Number Generators for Cryptographic Applications. National Institute of Standards and Technology (NIST), 2010.

Lee, Jae W., et al. "A technique to build a secret key in integrated circuits for identification and authentication applications." IEEE Symp. VLSI Circuits, 2004.

Lin Liu, Hui Huang, and Shiyan Hu. Lorenz chaotic system-based carbon nanotube physical unclonable functions. IEEE Transactions on Computer-Aided Design of Integrated Circuits and Systems, 37(7):1408-1421, 2018.

Lohmann, Johannes, et al. "Transient dynamics and their control in time-delay autonomous Boolean ring networks." Physical Review E 95.2 (2017): 022211.

Noriyuki Miura, et al., Chaos, Deterministic Non-Periodic Flow, for Chip-Package-Board Interactive PUF. IEEE Asian Solid-State Circuits Conference Nov. 6-8, 2017/Seoul, Korea. S3-2 (2141) pp. 25-28.

Noriyuki Miura, et al., Chip-Package-Board Interactive PUF Utilizing Coupled Chaos Oscillators With Inductor. IEEE Journal of Solid-State Circuits, vol. 53, No. 10, Oct. 2018. 2889-2897.

Otti D'Huys, Johannes Lohmann, Nicholas D Haynes, and Daniel J Gauthier. Super-transient scaling in time-delay autonomous boolean network motifs. Chaos: An Interdisciplinary Journal of Nonlinear Science, 26(9):094810, 2016.

Peter Simons, Erik van der Sluis, and Vincent van der Leest. Buskeeper PUFs, a promising alternative to d flip-flop PUFs. In 2012 IEEE International Symposium on Hardware-Oriented Security and Trust, pp. 7-12. IEEE, 2012.

Pim Tuyls, Boris Škorić, Sjoerd Stallinga, Anton HM Akkermans, and Wil Ophey. Information-theoretic security analysis of physical uncloneable functions. In International Conference on Financial Cryptography and Data Security, pp. 141-155. Springer, 2005.

Rajdeep Bhanot and Rahul Hans. A review and comparative analysis of various encryption algorithms. International Journal of Security and Its Applications, 9(4):289-306, 2015.

Rosin, David P. Dynamics of complex autonomous Boolean networks. TU Berlin and Duke University, Ph.D. Thesis (2014).

Rosin, David P., et al. "Control of synchronization patterns in neural-like Boolean networks." Physical Review Letters 110.10 (2013): 104102.

Sanu K Mathew, Sudhir K Satpathy, Mark A Anders, Himanshu Kaul, Steven K Hsu, Amit Agarwal, Gregory K Chen, Rachael J

(56) References Cited

OTHER PUBLICATIONS

Parker, Ram K Krishnamurthy, and Vivek De. 16.2 a 0.19 pj/b pvt-variation-tolerant hybrid physically unclonable function circuit for 100% stable secure key generation in 22 nm CMOS. In 2014 IEEE International Solid-State Circuits Conference Digest of Technical Papers (ISSCC), pp. 278-279. IEEE, 2014.

Stefan Katzenbeisser, Unal Kocabaş, Vladimir Rožić, Ahmad-Reza Sadeghi, Ingrid Verbauwhede, and Christian Wachsmann. PUFs: Myth, fact or busted? a security evaluation of physically unclonable functions (PUFs) cast in silicon. In International Workshop on Cryptographic Hardware and Embedded Systems, pp. 283-301. Springer, 2012.

Suh, G. Edward, and Srinivas Devadas. "Physical unclonable functions for device authentication and secret key generation." Proc. Design Automation Conf. ACM, 2007.

Taner Tuncer, The implementation of chaos-based PUF designs in field programmable gate array. Nonlinear Dyn (2016) 86:975-986. DOI 10.1007/s11071-016-2938-3.

Tanya Ignatenko, Geert-Jan Schrijen, Boris Skoric, Pim Tuyls, and Frans Willems. Estimating the secrecy-rate of physical unclonable functions with the context-tree weighting method. In 2006 IEEE International Symposium on Information Theory, pp. 499-503. IEEE, 2006.

Thomas McGrath, Ibrahim E Bagci, Zhiming M Wang, Utz Roedig, and Robert J Young. A PUF taxonomy. Applied Physics Reviews, 6(1):011303, 2019.

Ulrich Ruhrmair, Frank Sehnke, Jan Solter, Gideon Dror, Srinivas Devadas, and Jurgen Schmidhuber. Modeling attacks on physical unclonable functions. In Proceedings of the 17th ACM conference on Computer and communications security, pp. 237-249. ACM, 2010.

Ulrich Ruhrmair, Heike Busch, and Stefan Katzenbeisser. Strong pufs: models, constructions, and security proofs. In Towards hardware-intrinsic security, pp. 79-96. Springer, 2010.

Van den Berg, Robbert. Entropy analysis of physical unclonable functions. Eindhoven University of Technology, M.Sc. Thesis (2012).

Yu, Meng-Day Mandel, and Srinivas Devadas. "Recombination of physical unclonable functions." (2010).

Zhang, Rui, et al. "Boolean chaos." Physical Review E 80.4 (2009): 045202.

European Patent Office. Extended European Search Report. Issued in European Application No. 20818519.9 dated Jun. 1, 2023. 10 pages.

Park et al. True random number generation using CMOS Boolean chaotic oscillator. Microelectronics Journal 46(12), 2015:1364-1370.

Suh et al. Physical unclonable functions for device authentication and secret key generation. Proceedings of the 44th annual design automation conference, 2007: 9-14.

Haynes et al. Reservoir computing with a single time-delay autonomous Boolean node. Physical Review E 91(2), 2015:020801.

\* cited by examiner

_US 11,841,983 B2_

SYSTEMS AND METHODS USING HYBRID BOOLEAN NETWORKS AS PHYSICALLY UNCLONABLE FUNCTIONS

CROSS-REFERENCE TO RELATED APPLICATIONS

This application is a national stage application filed under 35 U.S.C. § 371 of PCT/US2020/027072 filed Apr. 7, 2020, which claims the benefit of U.S. provisional patent application No. 62/858,542, filed on Jun. 7, 2019, and entitled "SYSTEMS AND METHODS USING HYBRID BOOLEAN NETWORKS AS PHYSICAL UNCLONABLE FUNCTIONS," and U.S. provisional patent application No. 62/906,244, filed on Sep. 26, 2019, and entitled "SYSTEMS AND METHODS USING HYBRID BOOLEAN NETWORKS AS PHYSICAL UNCLONABLE FUNCTIONS," the disclosures of which are expressly incorporated herein by reference in their entireties.

STATEMENT REGARDING FEDERALLY FUNDED RESEARCH

This invention was made with government support under Grant no. W31P4Q-19-C-0014 awarded by the Department of the Army. The government has certain rights in the invention.

BACKGROUND

The creation, storage, and distribution of cryptographic keys remains an active area of research due to the ever-increasing demand for privacy protection and secure computing [See J. Zhang et al. Key generation from wireless channels: A review. _IEEE Access_, 4:614-626, 2016; R. Bhanot et al. A review and comparative analysis of various encryption algorithms. _International Journal of Security and Its Applications_, 9(4):289-306, 2015; P. Tuyls et al. _Security with noisy data: on private biometrics, secure key storage and anti-counterfeiting_. Springer Science & Business Media, 2007]. An emerging technology well suited to these tasks are Physically Unclonable Functions (PUFs), which act as "digital fingerprints" by generating cryptographic keys without explicitly needing to store them [See T. McGrath et al. A PUF taxonomy. _Applied Physics Reviews_, 6(1):011303, 2019]. At their most basic level, PUFs are physical devices that reliably map an input bit string (sometimes referred to herein as a "challenge") to an output bit string (sometimes referred to herein as a "response") in a way that is unique to a particular copy (sometime referred to herein as an "instance") of that PUF. This behavior is a result of the PUF's extreme sensitivity to small variations in its manufacturing process. Specifically, a secure PUF design has the following properties: reliability, uniqueness, unclonability, and unpredictability. For example, given a particular PUF instance, the responses resulting from successive evaluations of the same challenge are identical up to a small error (i.e., reliable). Additionally, given two PUF instances and a particular challenge, the resulting responses are different (i.e., unique). Due to the nature of the construction process, no two PUF instances are likely to have identical challenge-response behavior (i.e., unclonable). And, even with knowledge of the construction process, it is difficult or impossible to infer the response to one challenge given the response to a different challenge (i.e., unpredictable).

PUFs are further categorized as weak or strong [See U. Ruhrmair et al. Strong pufs: models, constructions, and security proofs. In _Towards hardware-intrinsic security_, pages 79-96. Springer, 2010]. Weak PUFs possess only one or few possible challenges. Strong PUFs, on the other hand, contain an exponentially large number of independent keys, making attempts to extract all of them from a compromised device a difficult or impossible task. This property is highly desirable for authentication purposes. To see why this is so, consider the process of enrollment [See K. Frikken et al. Robust authentication using physically unclonable functions. In Pierangela Samarati, Moti Yung, Fabio Martinelli, and Claudio A. Ardagna, editors, _Information Security_, pages 262-277, Berlin, Heidelberg, 2009. Springer Berlin Heidelberg].

At the time of manufacturing, the manufacturer enrolls each PUF by collecting and storing a challenge-response pair (CRP) database associated with that device. Once the PUF is distributed to the user, the manufacturer authenticates the device by sending a challenge and requesting the corresponding response. Ideally, it becomes unlikely that temporary access to a strong PUF is sufficient for an adversary to obtain the required number of CRPs for impersonation. From this scenario two conditions of practical importance for strong PUFs are evident. First, it should take very little time for a PUF to be queried so that the process of enrollment and authentication are feasible at industrial scales. Second, the space of CRPs should be large enough such that even for a rapid querying process the full CRP database cannot be obtained in real time. A PUF can also be used to generate a public/private key pair locally. In this application, no enrollment is needed. Instead, the unique key is generated in response to the challenge.

Finally, it is desirable that a strong PUF produce multi-bit responses. This property serves to increase the entropy and reduce the number of CRPs required for authentication. For example, consider a naïve adversary who responds to each challenge by simply guessing 0 or 1 with 50% probability for each bit. For an ideal strong PUF with single-bit responses, the probability the adversary guesses each bit correctly after, e.g., 7 challenges is 0.57 z 1%. For an ideal 7-bit PUF, this same threshold is reached after only a single challenge. Many existing PUFs possess only one or a few (but not all) of the following properties: (1) existing PUFs produce only a single bit response, significantly lowering their entropy; (2) existing PUFs require a large amount of time to build CRP databases, preventing widespread adoption for authentication; (3) existing PUFs are "weak" in the sense that they have only one or a few possible challenge-response pairs, significantly reducing security applications; and (4) existing PUFs difficult or costly to manufacture and use, reducing practicality.

SUMMARY

An example integrated circuit (IC) chip is described herein. The IC chip includes a physically unclonable function (PUF) and an auxiliary circuit. The PUF is a hybrid Boolean network. Additionally, the auxiliary circuit is configured to receive a transient response enable signal.

Additionally, the auxiliary circuit is configured to introduce a time delay. A duration of the time delay is related to a characteristic time scale of the hybrid Boolean network.

Alternatively or additionally, in some implementations, the auxiliary circuit includes a plurality of electronic devices, where each electronic device is configured to implement a Boolean operation. For example, the auxiliary circuit can include a plurality of pairs of series-connected inverter gates.

Alternatively or additionally, in some implementations, the auxiliary circuit includes a plurality of electronic devices, where each electronic device is configured to implement a copy operation.

Alternatively or additionally, the hybrid Boolean network includes a plurality of electronic devices, where each electronic device is configured to implement a Boolean operation. The hybrid Boolean network may include clocked and un-clocked electronic devices. Optionally, in some implementations, the hybrid Boolean network is configured as a modified random number generator.

Alternatively or additionally, the IC chip further includes a substrate. The hybrid Boolean network and the auxiliary circuit are disposed on the substrate. In some implementations, the hybrid Boolean network and the auxiliary circuit are located in close physical proximity to each other on the substrate. For example, the hybrid Boolean network and the auxiliary circuit can optionally be located adjacent to one another on the substrate.

Alternatively or additionally, the IC chip optionally further includes a plurality of PUFs, where each PUF includes a respective hybrid Boolean network. In some implementations, the IC chip further includes a combiner circuit configured to combine respective outputs of each of the PUFs. Optionally, the combiner circuit includes a PUF.

In some implementations, the IC chip is a field-programmable gate array (FPGA). Alternatively, in other implementations, the IC chip is an application-specific IC (ASIC) chip.

In some implementations, the IC chip optionally further includes a register, where the register is configured to receive the transient response enable signal via the auxiliary circuit. Additionally, the register is configured to capture a response of the PUF.

An example method for using a PUF to provide cybersecurity is described herein. The method includes inputting a challenge bit string into a PUF. The PUF includes a circuit configured to exhibit chaotic behavior. The challenge bit string sets an initial state of the circuit. Additionally, the method includes releasing the circuit from the initial state, capturing a transient response bit string from the circuit, and using the transient response bit string to provide cybersecurity. The transient response bit string is captured a predetermined period of time after release from the initial state.

For example, the transient response bit string is captured during a transient state of the circuit. Additionally, a duration of the transient state is related to a characteristic time scale of the circuit. Additionally, the predetermined period of time is about ten times the characteristic time scale of the circuit.

Alternatively or additionally, the circuit is optionally a hybrid Boolean network. The hybrid Boolean network includes a plurality of electronic devices, where each electronic device is configured to implement a Boolean operation. Additionally, the hybrid Boolean network includes clocked and un-clocked electronic devices. In this implementations, the step of inputting a challenge bit string into a PUF includes supplying a respective voltage according to each bit of the challenge bit string to a respective one of the electronic devices. The challenge bit string has a length of N bits, where N is greater than or equal to 2. Alternatively or additionally, the step of capturing a transient response bit string from the circuit includes detecting a respective state of each of the electronic devices, where the respective states of the electronic devices correspond to respective values of each bit of the transient response bit string. The transient response bit string has a length of N bits, where N is greater than or equal to 2. Optionally, the hybrid Boolean network can be configured as a modified random number generator.

Alternatively or additionally, in some implementations, the step of capturing a transient response bit string from the circuit optionally includes capturing a plurality of response bit strings from the circuit. Additionally, the method further includes obtaining the final response bit string from the plurality of response bit strings. For example, the final response bit string can include one or more bits selected from each of the response bit strings. In some implementations, the one or more bits selected from each of the response bit strings are determined using a cryptographic key. Alternatively, in other implementations, the one or more bits selected from each of the response bit strings are determined using a predetermined key.

Alternatively or additionally, in some implementations, the method further includes determining whether the transient response bit string is associated with the challenge bit string. The transient response bit string is used to provide cybersecurity if the transient response bit string is associated with the challenge bit string. For example, the step of determining whether the transient response bit string is associated with the challenge bit string includes querying a challenge-response pair database.

Alternatively or additionally, in some implementations, the transient response bit string is used to authenticate a device.

Alternatively or additionally, in some implementations, the transient response bit string is used as a cryptographic key.

An example method for PUF enrollment is also described herein. The method includes providing a PUF. The PUF includes a circuit configured to exhibit chaotic behavior. Additionally, the method includes inputting a challenge bit string into the PUF, where the challenge bit string sets an initial state of the circuit, and releasing the circuit from the initial state. The method further includes capturing a transient response bit string from the circuit, and storing the challenge bit stream and the transient response bit string in a challenge-response pair database. The transient response bit string is captured a predetermined period of time after release from the initial state Additionally, the method optionally further includes inputting a plurality of challenge bit strings into the PUF and capturing a plurality of transient response bit strings from the circuit. The challenge-response pair database associates respective challenge and transient response bit strings.

Alternatively or additionally, the method further includes transmitting a selected challenge bit string to a physical device, receiving a response to the selected challenge bit string from the physical device, querying the challenge-response pair database to determine whether the response is associated with the selected challenge question, and transmitting a result of the challenge-response pair database query to the physical device.

Another example method for using a PUF to provide cybersecurity is also described herein. The method includes inputting a respective challenge bit string into each of a plurality of physically unclonable functions (PUFs). Each of the PUFs includes a respective circuit configured to exhibit chaotic behavior, and the respective challenge bit strings set a respective initial state of each of the respective circuits. The method also includes releasing each of the respective circuits from the respective initial state, capturing a respective transient response bit string from each of the respective circuits, combining the respective transient response bit strings to obtain a combined response bit string for the PUFs, and using the combined response bit string to provide cybersecurity.

An example system is also described herein. The system includes an IC chip including a PUF, where the PUF includes a circuit configured to exhibit chaotic behavior. The system also includes a physical device including a processor and a memory operably coupled to the processor, wherein the memory has computer-executable instructions stored thereon. The IC chip is a component part of the physical device. The physical device is configured to input a challenge bit string into the PUF, where the challenge bit string sets an initial state of the circuit, and release the circuit from the initial state. The physical device is further configured to capture a transient response bit string from the circuit, and use the transient response bit string to provide cybersecurity. The transient response bit string is captured a predetermined period of time after release from the initial state.

Additionally, the system can further include a verifier device. The verifier device is operably coupled to the physical device, for example, by a network. The physical device is optionally further configured to request the challenge bit string from the verifier device, and receive the challenge bit string from the verifier device in response to the request. The physical device is further configured to determine whether the transient response bit string is associated with the challenge bit string. The transient response bit string is used to provide cybersecurity if the transient response bit string is associated with the challenge bit string.

Alternatively or additionally, the verifier device is configured to query a challenge-response pair database to determine whether the transient response bit string is associated with the challenge bit string, and transmit a result of the challenge-response pair database query to the physical device.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 6A is a diagram of the HBN-RNG. FIGS. 6B-6D are components of the HBN-RNG of FIG. 6A. Random numbers are read from the state of the clocked readout (see FIG. 6D). FIG. 6E is a diagram of the HBN-PUF. FIGS. 6F and 6G are components of the HBN-PUF of FIG. 6E. Random numbers are read from the state of the clocked readout (see FIG. 6D). The response is read from the clocked readout after one clock cycle (see FIG. 6G). The initial conditions of the autonomous portion are specified by the challenge string (see FIG. 6F). The network is released from initial conditions by changing the value of the RESET bit (see FIG. 6F).

FIG. 7A illustrates maximum and minimum reliability for N=16. FIG. 7B illustrates mean reliability and uniqueness for N=16. FIG. 7C illustrates maximum and minimum reliability for N=256. FIG. 7D illustrates mean reliability and uniqueness for N=256. FIGS. 7A and 7C illustrate reliability statistics on a per-chip basis. Note overlap indicating similar reliability; all other chip distributions lie between these two. FIGS. 7B and 7D illustrate averaged statistics on a per-challenge basis. Note clear separation of intra and inter distributions, indicating strong reliability and uniqueness for both network sizes.

FIG. 12A illustrates N=16 node network performance at each temperature (T). FIG. 12B illustrates N=16 node network variation at each T. FIG. 12C illustrates N=256 node network performance at each T. FIG. 12D illustrates N=256 node network variation at each T.

DETAILED DESCRIPTION

Figure 1:
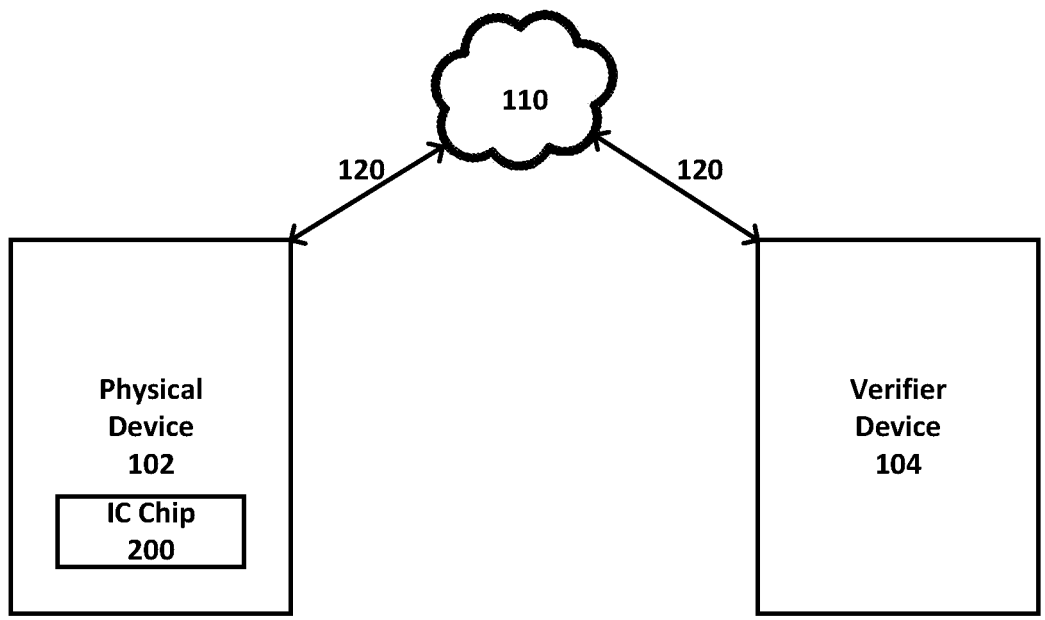
FIG. 1 is a block diagram of an example system according to implementations described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. As used herein, the terms "about" or "approximately", when used in reference to a measurement of time (e.g., duration) or physical dimension, mean within plus or minus 10 percentage of the referenced measurement.

As described above, a physically unclonable function (PUF) is a hardware cybersecurity primitive. A PUF produces a unique, unpredictable response when queried with a challenge. A PUF therefore provides a unique fingerprint (e.g., a "silicon fingerprint"), which is the result of entropy derived from manufacturing variances. PUFs can be used for cybersecurity applications including, but not limited to, secure key generation, memoryless key storage, device authentication, anti-counterfeiting, and intellectual property protection. Using a PUF requires the user to present a "challenge" set of information (such as a set of binary bits), and the PUF generates a "response" set of information, which is then checked against a challenge-response pair (CRP) database. Conventional PUF devices tend to be slow (e.g., a long time between challenge and response) and/or produce a response bit sequence that is much smaller than the challenge bit sequence, thus limiting the security of the PUF. Also, conventional PUF's can be "learned," that is, the set of challenge-response pairs can be deduced using various attack strategies such as using machine learning. In contrast, a PUF based on transient, likely chaotic, dynamics of a hybrid Boolean network realized on a field-programmable gate array (FPGA) or application-specific integrated circuit (ASIC) are described herein. Slight manufacturing differences in the FPGA or ASIC, such as logic element rise and fall times, logic element threshold differences, and slight differences in delay of signals propagating on the chip, cause different transient behaviors of the Boolean network (different responses) to different challenge bit sequences, which are used as initial conditions for the network.

Referring now to FIG. 1, an example system is shown. The system includes a physical device 102 and a verifier device 104, where the physical device 102 is operably coupled to the verifier device 104. The physical device 102 and the verifier device 104 can be operably coupled by one or more communication links. This disclosure contemplates that the one or more communication links are any suitable communication link. For example, a communication link may be implemented by any medium that facilitates data exchange between the physical device 102 and the verifier device 104 including, but not limited to, wired, wireless and optical links. This disclosure contemplates that each of the physical device 102 and the verifier device 104 can be or can include a computing device (e.g., at least a processing unit and memory such as the basic computing device configuration of box 502 shown in FIG. 5). Additionally, this disclosure contemplates that the physical device 102 can be an electronic device, for example, including but not limited to a consumer electronic device.

Optionally, and as shown in FIG. 1, the physical device 102 and the verifier device 104 are operably coupled via one or more networks 110. This disclosure contemplates that the one or more networks 110 are any suitable communication network. The networks 110 can be similar to each other in one or more respects. Alternatively or additionally, the networks 110 can be different from each other in one or more respects. The networks 110 can include a local area network (LAN), a wireless local area network (WLAN), a wide area network (WAN), a metropolitan area network (MAN), a virtual private network (VPN), etc., including portions or combinations of any of the above networks. The physical device 102 and the verifier device 104 can be coupled to the networks 110 through one or more communication links 120, e.g., any medium that facilitates data exchange between the physical device 102 and the verifier device 104 including, but not limited to, wired, wireless and optical links.

As shown in FIG. 1, the physical device 102 includes an integrated circuit (IC) chip 200. In some implementations, the IC chip 200 includes a field-programmable gate array (FPGA). An FPGA is device used in electronic circuits. An FPGA is a semiconductor device including programmable logic blocks and interconnects. An FPGA is capable of being programmed after manufacture, for example, using a hardware description language (HDL). FPGAs are known in the art and therefore not described in further detail here. Alternatively, in other implementations, the IC chip 200 is an application-specific IC (ASIC). An ASIC is a customized IC chip. Unlike an FPGA, an ASIC is not capable of being programmed after manufacture. ASICs are known in the art and therefore not described in further detail here. The IC chip 200 is a component part of the physical device 102. For example, the IC chip 200 is arranged in/on, incorporated into, and/or embedded in the physical device 102. As described herein, the IC chip 200 includes a PUF, which includes a circuit configured to exhibit chaotic behavior. In some implementations described herein (e.g., with regard to FIGS. 2 and 6E-6G), the PUF a is a hybrid Boolean network. Alternatively, in other implementations, this disclosure contemplates that the PUF can be another type of circuit configured to exhibit chaotic behavior.

As described below, the physical device 102 is configured to input a challenge bit string into the PUF, where the challenge bit string sets an initial state of the circuit, and then release the PUF from the initial state. The physical device 102 is therefore configured to set the challenge and trigger release of the PUF. The physical device 102 is further configured to capture a transient response bit string from the PUF. As described herein, the physical device 102 can generate an enable signal, which triggers release of the PUF from the challenge state and capture of the transient response bit string from the PUF. For example, the physical device 102 can store the transient response bit string in memory. The transient response bit string is used to provide cybersecurity as described herein.

After the physical device 102 is manufactured, challenge-response pairs (CRPs) are generated and stored in memory of a computing device, e.g., in a database (also referred herein as a "challenge-response pair database" or "CRP database"). This process is known as the enrollment phase. This disclosure contemplates performing enrollment with the verifier device 104. In other words, the verifier device 104 is configured to input one or more challenge bit strings into the physical device 102 which then inputs the challenge bit string into the PUF, releases the PUF from its initial state, and captures the respective one or more response bit strings from the PUF. The verifier device 104 is configured to associate respective challenge-response pairs (i.e., associate respective challenge and response bit strings) by maintaining the database.

In this implementation, the verifier device 104 sends a challenge bit string to physical device 102 and requests the corresponding response bit stream. The physical device 102 receives the challenge bit string from the verifier device 104. The physical device 102 inputs the challenge bit string received from the verifier device 104 into the PUF, releases the PUF from its initial state, and captures a transient response bit string. The physical device 102 then transmits the captured transient response bit string to the verifier device 104, which queries the CRP database to determine whether the transient response bit string is associated with the challenge bit string. The verifier device 104 then transmit a result of the CRP database query to the physical device 102. The PUF is expected to produce a unique, unpredictable response when queried with a challenge. Thus, a particular transient response bit string should be received in response to a particular challenge bit string. This disclosure contemplates the challenge and response bit strings are communicated between the physical device 102 and the verifier device 104 via the networks 110.

Figure 2:
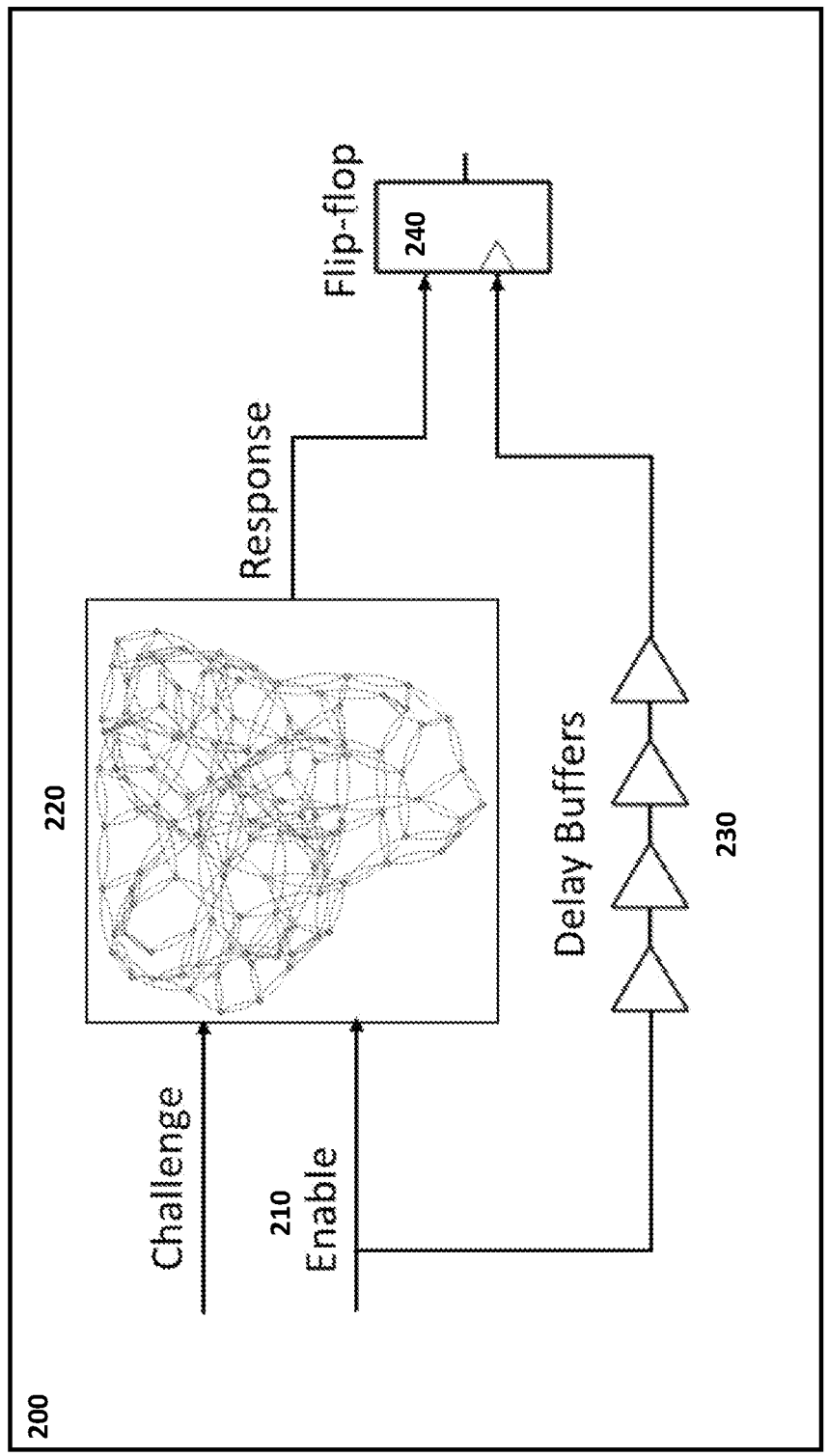
FIG. 2 is a block diagram of an example integrated circuit (IC) chip according to implementations described herein.
Figure 6A:
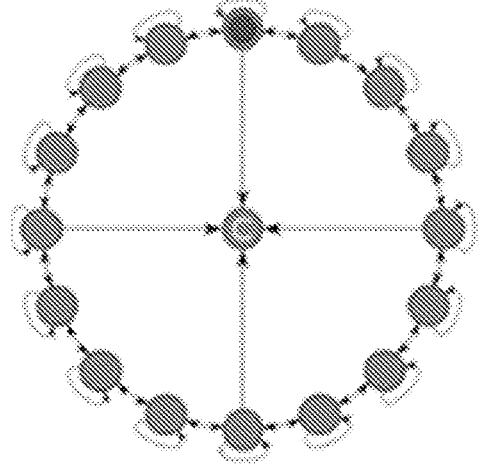
FIGS. 6A-6D illustrate an example hybrid Boolean network random number generator (HBN-RNG) with 16 nodes (N=16).
Figure 6B:
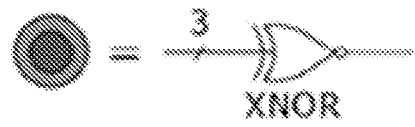
Figure 6C:
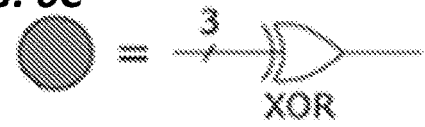
Figure 6D:
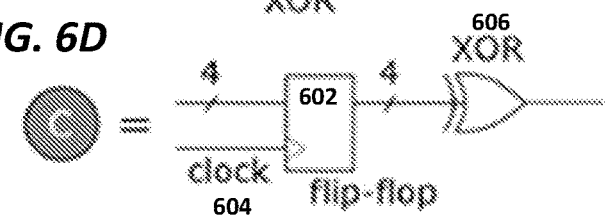
Figure 6E:
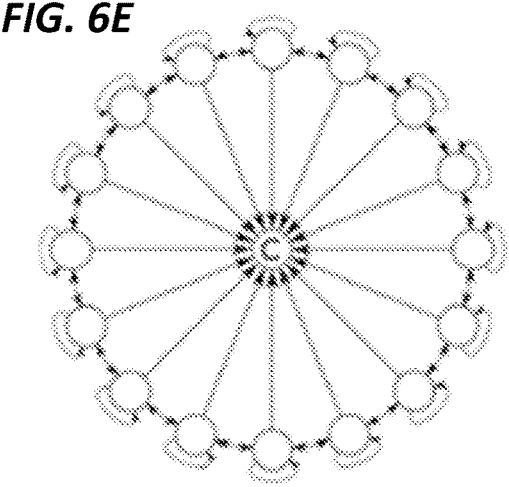
FIGS. 6E-6G illustrate an example HBN-PUF with 16 nodes (N=16) according to an implementation described herein.

Referring now to FIG. 2, an example IC chip is described shown. The IC chip 200 includes a PUF 220, an auxiliary circuit 230, and a register 240. As shown in FIG. 2, a transient response enable signal 210 is received by both the PUF 220 and the auxiliary circuit 230. In some implementations, the transient response enable signal 210 is generated by and transmitted to the IC chip from a physical device (e.g., physical device 102 shown in FIG. 1). For example, the transient response enable signal 210 may be generated by a signal generator of the physical device. The transient response enable signal 210 is fed through the auxiliary circuit 230 before triggering the register 240, which captures the transient response bit string (i.e., the output of the PUF 220 in response to the challenge bit string). As described herein, the auxiliary circuit 230 introduces a time delay to the transient response enable signal 210. In some implementations, the PUF 220 is a hybrid Boolean network. A hybrid Boolean network includes clocked and un-clocked electronic devices or logical elements (see e.g., FIGS. 6E-6G). Optionally, the PUF 220 constructed as a hybrid Boolean network is a chaotic oscillator configured as a modified random number generator (RNG) (e.g., as shown in FIG. 6E). Alternatively, the PUF 220 constructed as a hybrid Boolean network is an autonomous logic circuit configured to solve Boolean satisfiability problems.

The hybrid Boolean network can be implemented with an FPGA, for example, by coding the design into a hardware programming language and compiling the code. Alternatively, the hybrid Boolean network can be implemented on an ASIC. Tiny manufacturing variations in signal pathways and input impedance to nodes of the hybrid Boolean network, whether implemented with an FPGA or an ASIC, are sufficient to give rise to different chaotic transient behaviors. As described herein, the hybrid Boolean network includes a plurality of electronic devices, where each electronic device (also referred to herein as "logical element") is configured to implement a Boolean operation.

The IC chip 200 includes a substrate (not shown in FIG. 2), and the PUF 220 and the auxiliary circuit 230 are disposed on the substrate. In some implementations, the PUF 220 and the auxiliary circuit 230 are located in close physical proximity to each other on the substrate. For example, the PUF 220 and the auxiliary circuit 230 can optionally be located adjacent to one another on the substrate. The PUF 220 and the auxiliary circuit 230 can optionally be constructed using electronic devices that are located next to each other on the substrate. In other words, in this implementation, there would not be any intervening electronic devices located between the PUF 220 and the auxiliary circuit 230. It should be understood that locating the PUF 220 and the auxiliary circuit 230 adjacent to one another is provided only as an example of close physical proximity. For example, this disclosure contemplates that the PUF 220 and the auxiliary circuit 230 are in close physical proximity when the space between them is on micron scale (even if one or more electronic devices are arranged therebetween).

Figure 13A:
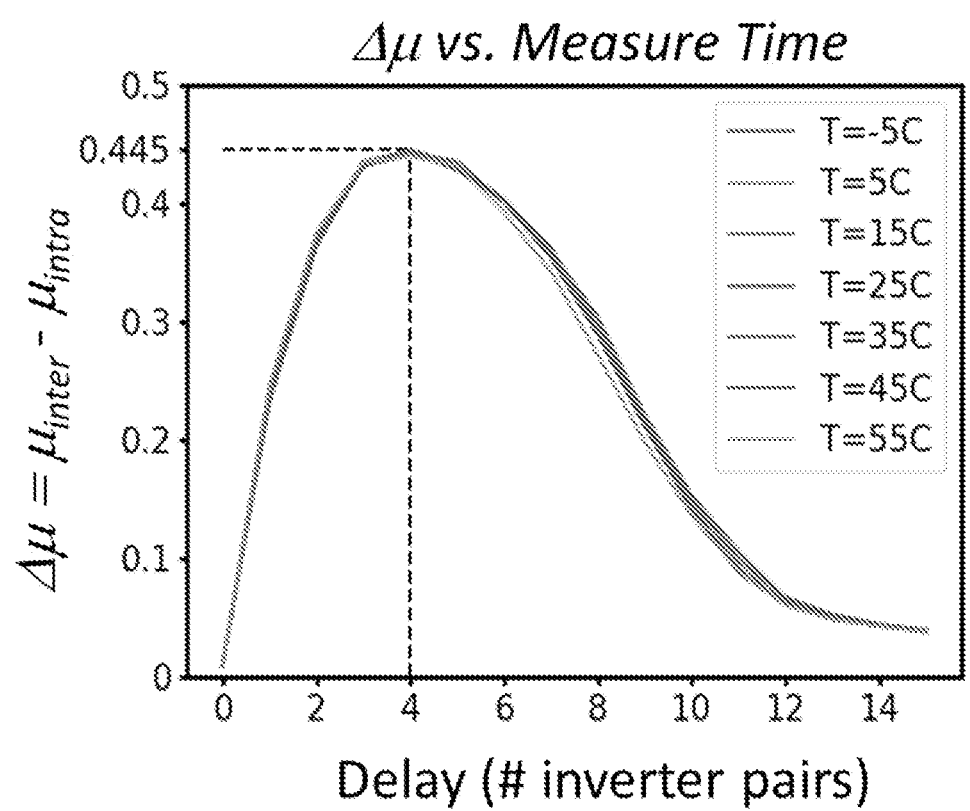
FIG. 13A is a graph illustrating $\Delta\mu=\mu_{inter}-\mu_{intra}$ versus measure time at various temperature points (i.e., T=−5, 5, 15, 25, 35, 45, 55° C.) of an example HBN-PUF with delay line trigger that cancels temperature dependence of the links. From FIG. 13A, it is observed that the optimal amount of delay is temperature independent.
Figure 13B:
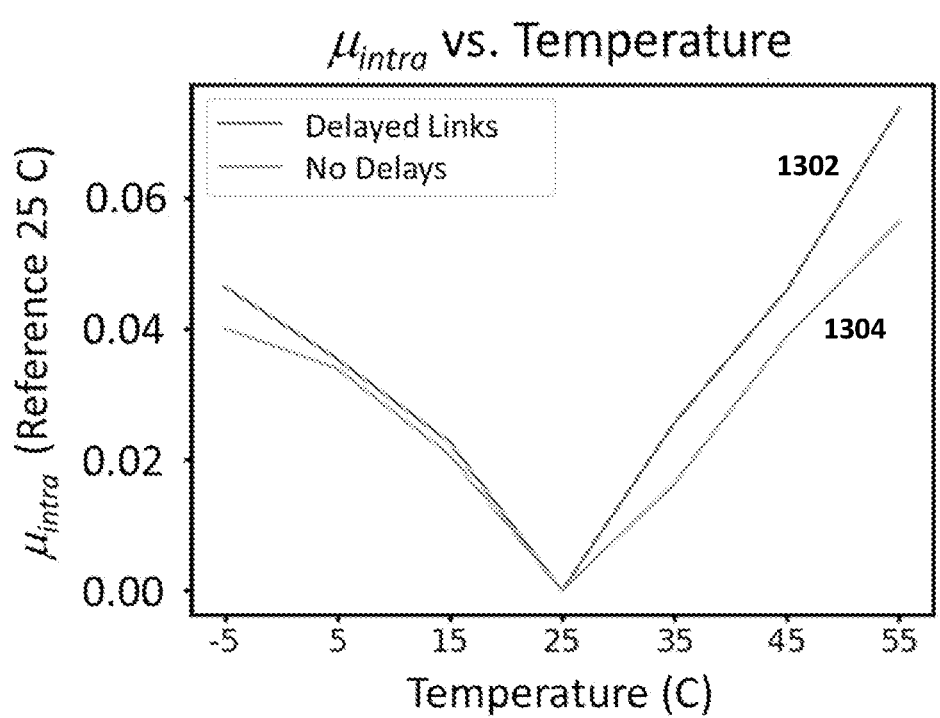
FIG. 13B is a graph illustrating $\mu_{intra}$ versus temperature for both an example HBN-PUF with delayed links (plot 1302) and without delayed links (plot 1304). There is a modest increase in $\mu_{intra}$ over the 60° C. range that can be controlled with standard error correction.

It should be understood that the characteristics of the PUF 220 change with temperature and/or supply voltage. In the following it should be understood that where temperature is referred to, similar statements about supply voltage apply. Additionally, it is desirable for the PUF 220 to function over relatively large temperature ranges and supply voltages. For example, the PUF 220 is a component of an electronic device, which may be subjected to various temperatures. Alternatively or additionally, the PUF 220 has a battery that provides less voltage as the battery is discharged. As noted above, the PUF's characteristics change with temperature and/or supply voltage. Typical clock signals (e.g., the transient response enable signal 210 shown in FIG. 2) used in the electronic devices in which the PUF 220 is integrated, however, have different temperature characteristics, which can negatively impact functionality of the PUF 220. For example, a clock signal may maintain the designed frequency as the temperature changes, but the time at which the PUF 220 should be measured to maximize its performance may change depending on the temperature. Thus, in order to provide a PUF that is robust with respect to temperature changes, the enable signal, which is generated by the physical device, is fed through the auxiliary circuit 230 before being used to trigger the register 240 to record the response of the PUF 220. The auxiliary circuit 230 is therefore configured to introduce a time delay which changes in a similar way as the PUF 220 with temperature and voltage. A duration of the time delay is related to a characteristic time scale of the PUF 220. As a result, the PUF 220 exhibits improved temperature stability as compared to conventional PUFs. This is demonstrated by FIGS. 13A and 13B.

Similar to the PUF 220, the auxiliary circuit 230 includes a plurality of electronic devices (also referred to herein as "logical elements"). The auxiliary circuit 230 therefore includes the same type of electronic devices included in the PUF 220. In other words, the temperature characteristics of the component devices of the PUF 220 and auxiliary circuit 230 are the same. Additionally, the auxiliary circuit 230 can be implemented with an FPGA or an ASIC (i.e., in the same manner as the PUF 220). As discussed above, the auxiliary circuit 230 is designed to introduce a time delay. In some implementations, each electronic device is configured to implement a Boolean operation. For example, the auxiliary circuit 230 can include a plurality of pairs of series-connected inverter gates. In other implementations, each electronic device is configured to implement a copy operation. It should be understood that the number of electronic devices in the auxiliary circuit 230 is directly related to the duration of time delay. For example, a greater number of electronic devices through with the transient response enable signal 210 is fed before being input into the register 240 results in a longer time delay. Accordingly, the number of electronic devices in the auxiliary circuit 230 can be selected based on the characteristic time scale of the PUF 220. As an example, the delay line of the auxiliary circuit 230 can be configured so that the duration of the time delay is about 10 characteristic time scales. It should be understood that 10 characteristic time scales is provided only as an example. This disclosure contemplates using a time delay more or less than 10 characteristic time scales.

Figure 3:
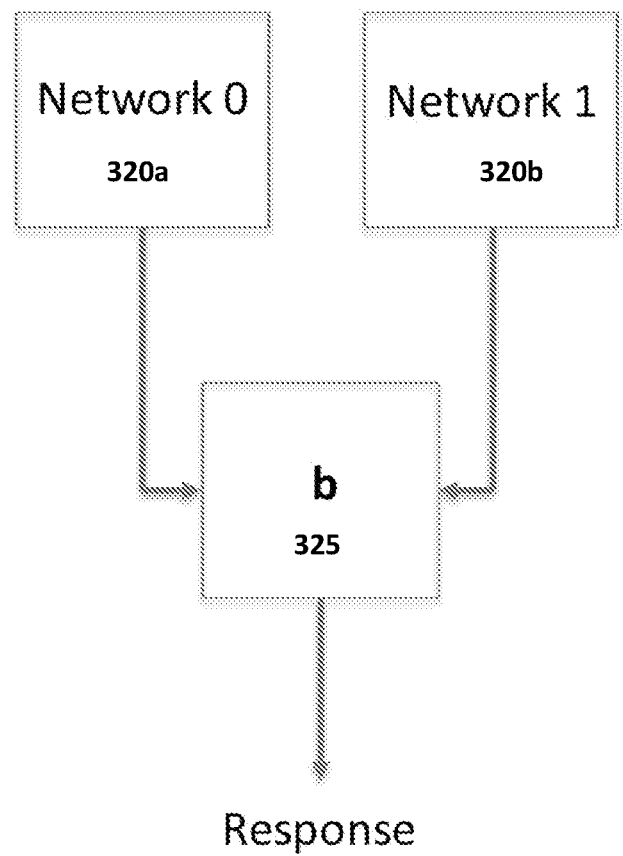
FIG. 3 is a block diagram illustrating a plurality of PUFs for use with an IC chip according to an implementation described herein.

Optionally, in some implementations, the IC chip 200 further includes a plurality of PUFs, where each PUF includes a respective hybrid Boolean network. For example, a plurality of PUFs are illustrated in FIG. 3. In FIG. 3, there are two PUFs, i.e., PUF 320a ("Network 0") and PUF 320b ("Network 1"). PUFs 320a and 320b are collectively referred to herein as PUFs 320. It should be understood that the two PUFs 320 are provided only as an example. This disclosure contemplates including more than two PUFs in the IC chip. Additionally, a combiner circuit 325 is provided. The combiner circuit 325 is configured to combine respective outputs of each of the PUFs 320. For example, the combiner circuit 325 can be configured to sample the respective bit strings output by PUFs 320 and combine these bit strings using a criterion. In some implementations, the combiner circuit 325 is a selector bit that is configured to flip according to a criterion (e.g., b=0: use certain bits from Network 0; b=1: use certain bits from Network 1). Alternatively or additionally, in some implementations, the criterion is a random number at manufacture time. Alternatively or additionally, in other implementations, the combiner circuit 325 includes a PUF, which is used to generate the criterion.

Figure 4A:
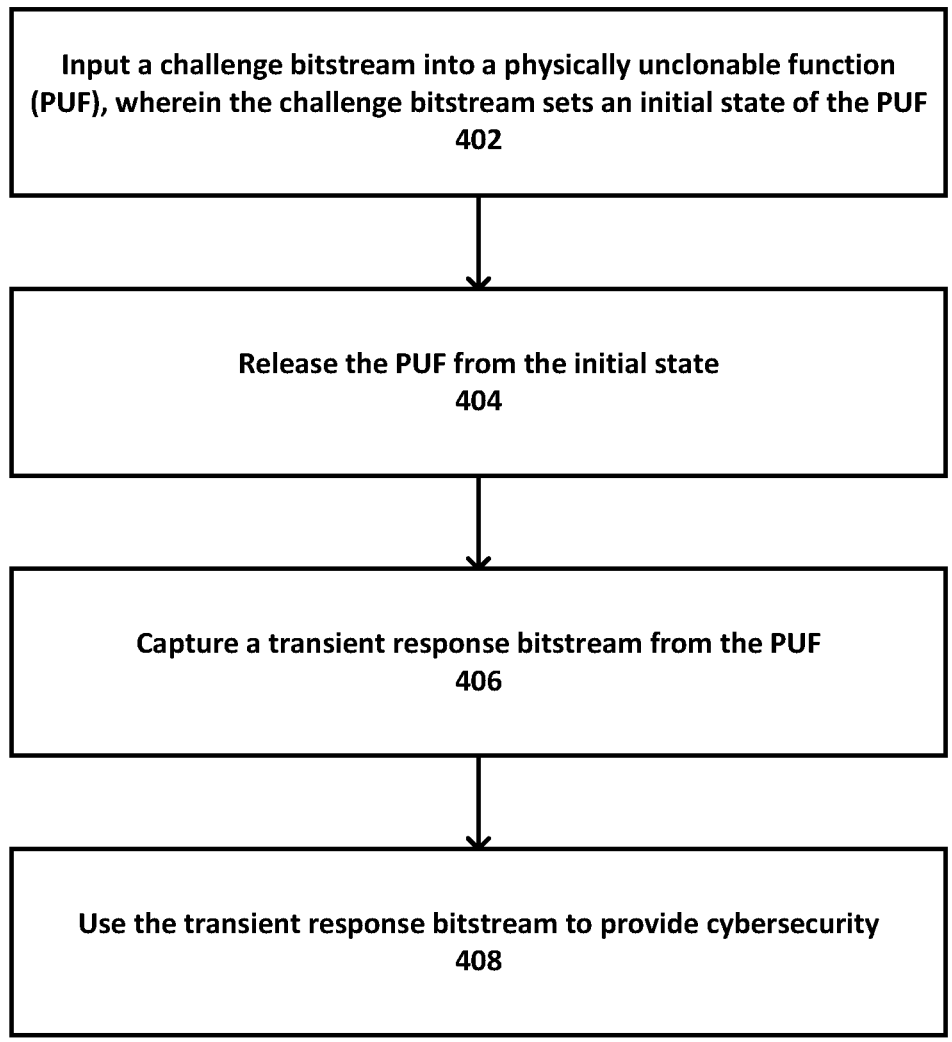
FIG. 4A is a flowchart illustrating example operations for using a PUF to provide cybersecurity according to an implementation described herein.

Referring now to FIG. 4A, example operations for using a PUF to provide cybersecurity are shown. This disclosure contemplates that the operations of FIG. 4A can be implemented using one or more of the devices and PUFs described with respect to FIGS. 1-3 and 6E-6G, for example. At step 402, a challenge bit string is input into a PUF (see e.g., FIGS. 2 and 6E). The step of inputting a challenge bit string into a PUF includes supplying a respective voltage (e.g., high voltage=logic 1)/low voltage=logic 0) according to each bit of the challenge bit string to a respective one of the electronic devices of the PUF. The challenge bit string has a length of N bits, where N is greater than or equal to 2. For example, N=16 for the PUF in FIG. 6E. The challenge bit string can be input into a node of the PUF, for example, on the "challenge" bit line shown in FIG. 6F. The challenge bit string sets an initial state of the PUF. At step 404, the PUF is released from the initial state. The step of releasing the PUF from its initial state includes flipping a RESET bit, which allows the hybrid Boolean network to evolve. This can be accomplished, for example, on the "reset" bit line shown in FIG. 6F.

At step 406, a transient response bit string is captured from the PUF. This can be accomplished, for example, at the output of the flip-flop shown in FIG. 6G. The step of capturing a transient response bit string from the PUF includes detecting a respective state (e.g., high voltage/low voltage) of each of the electronic devices, where the respective states of the electronic devices correspond to respective values of each bit of the transient response bit string (e.g., high voltage=logic 1)/low voltage=logic 0). The transient response bit string has a length of N bits, where N is greater than or equal to 2. For example, N=16 for the PUF in FIG. 6E. The PUFs described herein (e.g., as shown in FIGS. 2 and 6E-6G) produce multiple bits per challenge, which improves resistance to machine learning attack and/or increase total entropy. Additionally, the transient response bit string is captured a predetermined period of time after releasing the PUF from the initial state at step 404. For example, the transient response bit string is captured during a transient state of the PUF. The duration of the transient state is related to a characteristic time scale of the PUF. Additionally, the predetermined period of time is about ten times the characteristic time scale of the PUF. For example, in some implementations, the predetermined period of time is about 1 nanosecond (ns).

In some implementations, the step of capturing a transient response bit string from the PUF optionally includes capturing a plurality of response bit strings from the PUF. Each of the response bit strings is captured at a different time (e.g., periodically) during the transient period. In this way, multiple responses are collected within the transient state. The transient response bit string is then obtained from the response bit strings. For example, the transient response bit string can include one or more bits selected from each of the response bit strings. In some implementations, the one or more bits selected from each of the response bit strings are determined using a cryptographic key, which can optionally be generated using another PUF. Alternatively, in other implementations, the one or more bits selected from each of the response bit strings are determined using a predetermined key, which can optionally be assigned at the time of manufacture.

At step 408, the transient response bit string is used to provide cybersecurity. In some implementations, the transient response bit string is used to authenticate a device. Alternatively, in other implementations, the transient response bit string is used as a cryptographic key. It should be understood that authentication and secure key generation are provided only as example applications. This disclosure contemplates using the PUFs described herein for other applications including, but not limited to, memoryless key storage, anti-counterfeiting, tamper-proofing, secure communications, and intellectual property protection. As described herein, the PUF is expected to produce a unique, unpredictable response (e.g., a fingerprint) when queried with a challenge. There is an expectation that a particular transient response bit string should be received in response to a particular challenge bit string. Such correspondences (i.e., CRPs) can be stored in a database as described herein. Thus, for authentication, if the transient response bit string received at step 408 is a match for the challenge bit string input at step 402, then a device (e.g., physical device 102 shown in FIG. 1) can be authenticated. For secure key generation, the transient response bit string, which is unique and unpredictable, can be used as a key or portion thereof. Such a key need not be stored on the device and it can only be generated by the device itself. Additionally, it should be understood that the enrollment process, including generation of the CRP database, is not needed for secure key applications. The key (e.g., public or private key) is the transient response bit string received in response to the challenge bit string. There is no need to perform a comparison.

Figure 4B:
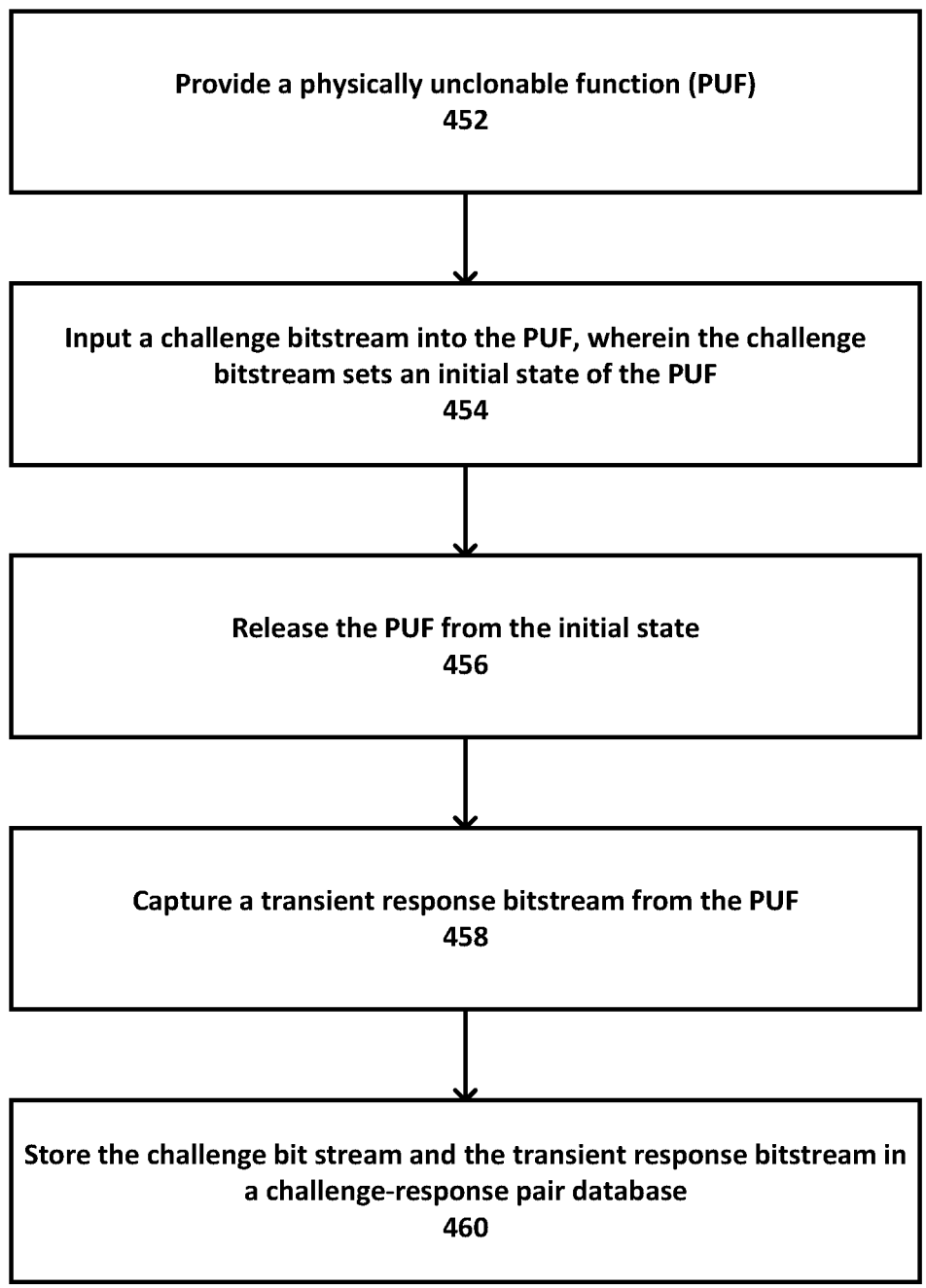
FIG. 4B is a flowchart illustrating example operations for PUF enrollment according to an implementation described herein.

Referring now to FIG. 4B, example operations for PUF enrollment are shown. This disclosure contemplates that the operations of FIG. 4B can be implemented using one or more of the devices and PUFs described with respect to FIGS. 1-3 and 6E-6G, for example. At step 452, a PUF is provided. For example, the PUF can be one of the PUFs described with regard to FIGS. 2 and 6E. At step 454, a challenge bit string is input into the PUF, where the challenge bit string sets an initial state of the PUF. At step 456, the PUF is released from its initial state. At step 458, a transient response bit string is captured from the PUF. It should be understood that steps 454-458 are similar to steps 402-406 described above with regard to FIG. 4A. Thereafter, at step 460, the challenge bit stream and the transient response bit string are stored in a challenge-response pair database. This disclosure contemplates that steps 454-460 can be performed by a verifier device (e.g., verifier device 104 as shown in FIG. 1). Additionally, this disclosure contemplates that steps 454-460 can be performed following manufacture of PUF.

It should be appreciated that the logical operations described herein with respect to the various figures may be implemented (1) as a sequence of computer implemented acts or program modules (i.e., software) running on a computing device (e.g., the computing device described in FIG. 5), (2) as interconnected machine logic circuits or circuit modules (e.g., hardware such as an FPGA) within an electronic device and/or (3) a combination of software and hardware of an electronic device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Example Computing Device

Figure 5:
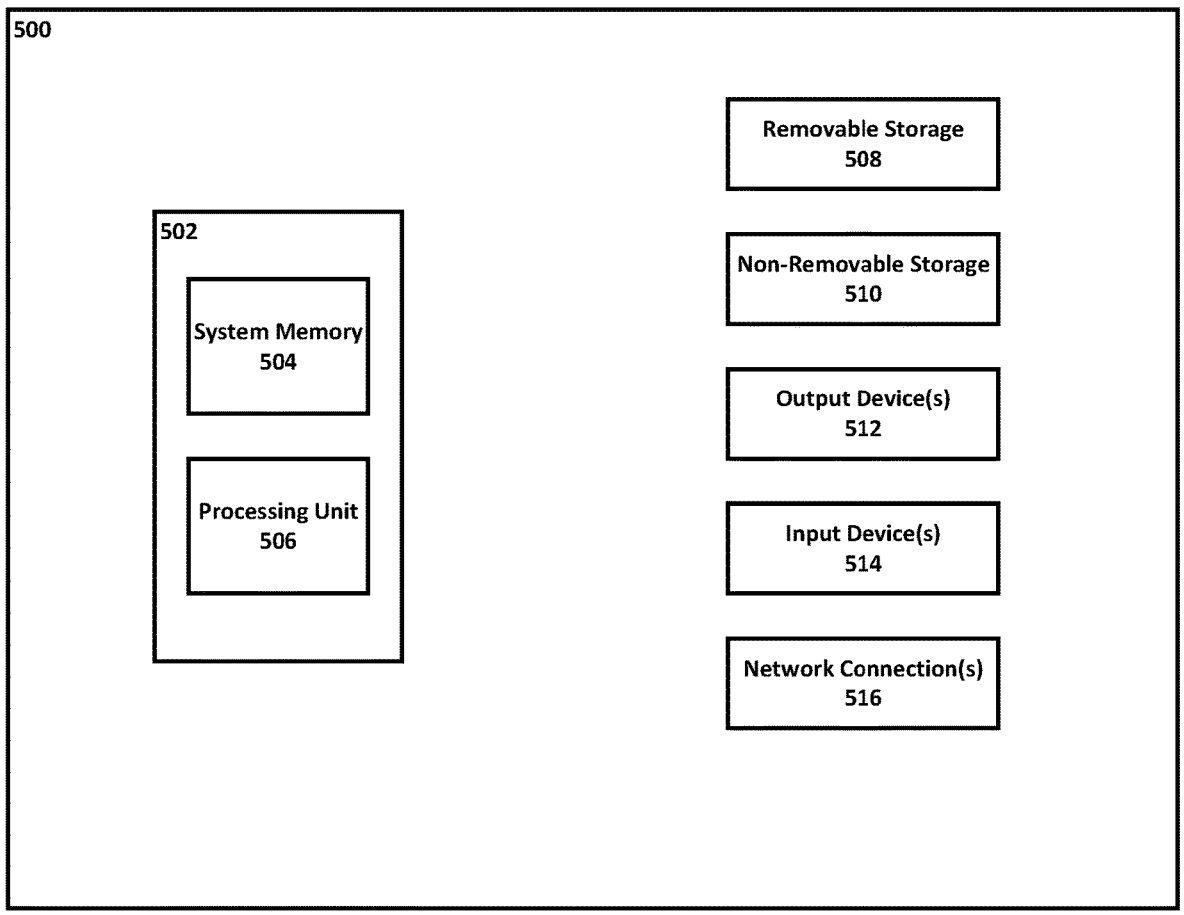
FIG. 5 is an example computing device.

Referring to FIG. 5, an example computing device 500 upon which the methods described herein may be implemented is illustrated. It should be understood that the example computing device 500 is only one example of a suitable computing environment upon which the methods described herein may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example tangible, computer-readable media may include, but is not limited to, volatile media, non-volatile media, removable media and non-removable media implemented in any method or technology for storage of information such as computer readable instructions, data structures, program modules or other data. System memory 504, removable storage 508, and non-removable storage 510 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

EXAMPLES

Physically unclonable functions (PUFs) are devices that exploit small variations in a manufacturing process to create unique and stable identifying characteristics with applications ranging from intellectual property protection and device authentication to secret key exchange. Presented below is a PUF design including a chaotic Boolean network implemented on a field-programmable gate array, which is capable of generating challenge-response pairs in as little as 10 nanoseconds (ns). In contrast to other designs, multiple response bits per challenge are collected. This demonstrate an exponential scaling of entropy with network size. A high degree of uniqueness and reliability is found from the PUF design, respectively characterized by $\mu_{inter}=0.41\pm0.02$ and $\mu_{intra}=0.02\pm0.01$ for a 256-node network. It is further shown that the Boolean network is chaotic and resistant to a third-party machine learning attack, while exhibiting moderate temperature variation, which facilitates commercial use.

The circuit design described below is the only known strong PUF with multiple response bits built on commercially available off-the-shelf hardware. The PUF is a highly compact chaotic circuit with initial conditions set by the challenge bit string. The response bit string is generated by reading out the state of the circuit during its initial transient, typically within 10 ns. Specifically, the circuit design is a hybrid Boolean network (HBN) implemented on a field-programmable gate array (FPGA). PUF characteristics arise from tiny FPGA manufacturing variations in the wiring and logical elements, which alter the HBN dynamics and hence its challenge-response behavior as a PUF when compared across different FPGAs. Furthermore, the combination of nonlinear and chaotic dynamics with an exponential scaling of entropy with network size appears to result in resilience to machine-learning attacks. Lastly, this disclosure contemplates that the circuit design can double as a true hardware random number generator (HRNG) by letting the circuit continue to evolve well into the chaotic regime after the transient behavior.

PUF Design

Described below are definitions of different kinds of networks and previous work on a similarly designed system used for random number generation.

Hybrid Boolean Networks and Random Number Generation

Boolean networks are collections of connected nodes each in the state 0 or 1. The state of each node is determined by a Boolean function, which takes as inputs the states of all nodes connected to it, and outputs the new state of that node. An autonomous Boolean network (ABN) is a Boolean network whose functions update without regard to an external clock: their dynamics occur as fast as the physical substrate allows. ABN dynamics are highly sensitive to variations in propagation speed along the links of the network and changes in the rise and fall time of each node, making them attractive candidates as components of a PUF. This is in contrast to a clocked Boolean network, such as one implemented in software, which updates all node states synchronously using a global clock. Hybrid Boolean networks (HBNs) contain both clocked and unclocked components.

As studied by Rosin [See D. Rosin. Ultra-fast physical generation of random numbers using hybrid Boolean networks. In *Dynamics of Complex Autonomous Boolean Networks*, pages 57-79. Springer, 2015; D. Rosin et al. Ultrafast physical generation of random numbers using hybrid Boolean networks. *Physical Review E*, 87(4):040902, 2013], HBNs implemented on field-programmable gate arrays (FPGAs) can be used to produce extremely high random bit rates when used for random number generation. This is useful for many secure communication protocols, including the popular Rivest-Shamir-Adleman cryptosystem [See J. Jonsson and B. Kaliski. Public-key cryptography standards (PKCS) #1: RSA cryptography specifications version 2.1. Technical report, 2003], which rely on the generation of random numbers for encrypting secure data. Generating random numbers as quickly as possible offers a security advantage by increasing the rate at which data can be encrypted and decreasing the time that cryptographic keys must be stored.

Rosin's construction, which is referred to herein as an HBN-RNG, was designed to create a chaotic physical system on an FPGA whose dynamics rapidly approach the maximum frequency allowed by the hardware. The HBN-RNG is shown in FIG. 6A. FIGS. 68-6D illustrate the components of the HBN-RNG shown in FIG. 6A. This rate is given by the reciprocal of the finite rise- and fall-times of the logic elements (LEs) on the FPGA, which vary across FPGAs and LEs. For Altera Cyclone IV FPGAs, the rise and fall times are roughly 0.27±0.01 ns [See D. Rosin et al. Ultrafast physical generation of random numbers using hybrid Boolean networks. *Physical Review E*, 87(4):040902, 2013], a quantity which for convenience is defined approximately as $\tau/2$ so that $\tau \approx 0.5$ ns. This gives a maximum frequency of around 1 GHz. Such a rate permits the HBN-RNG to generate random numbers faster than synchronous, clocked systems, which possess greater overhead. The HBN-RNG was also designed to exhibit self-excitation and not be biased toward logical high or low.

As shown in FIG. 6A-6D, the HBN-RNG is formed from a ring of N nodes, where each node is coupled to itself and its two neighbors. All but one of the nodes (i.e., the nodes illustrated by FIG. 6C) execute the 3-input XOR operation, returning 1 for an odd number of true inputs and 0 else. One of the nodes (i.e., the node illustrated by FIG. 6B) executes the XNOR operation, the logical negation of the XOR operation, which breaks the rotational symmetry of the ring and forces self-excitation of the system. Referring now to FIG. 6D, the clocked portion of the HBN-RNG includes of a N-bit register 602 driven by a global clock 604 that records the state of four of the ABN nodes on its rising edge. The recorded bit strings are then passed through a final XOR gate 606 before being read out, which reduces bias if the incoming bit strings are sufficiently uncorrelated.

When implemented on an Altera Cyclone IV FPGA, a transition to chaos in the HBN-RNG occurs at N=5, above which the network becomes exponentially sensitive to initial conditions and LE parameter details. An efficient RNG can be realized with 128 copies of N=16 networks running in parallel, resulting in a 12.8 Gbit/s random bit rate.

HBN-PUF

The physical random number generator described above is "PUF-like" in a number of ways. First, tiny manufacturing variations in signal pathways and input impedance to nodes is sufficient to give rise to different chaotic transient behaviors, suggesting the PUF's uniqueness property. Second, the HBN-RNG shown in FIG. 6A and similar ABNs [See O. D'Huys et al. Super-transient scaling in time-delay autonomous Boolean network motifs. *Chaos: An Interdisciplinary Journal of Nonlinear Science*, 26(9):094810, 2016] have transients that can last many orders-of-magnitude longer than the characteristic timescale of the network, which is on the order of hundreds of picoseconds. This suggests a window of stability in the transient HBN response, where the network state is reliable in the sense described herein while retaining significant information about the physical details discussed above.

Figure 6F:
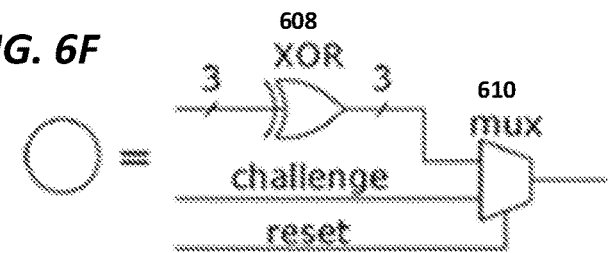
Figure 6G:
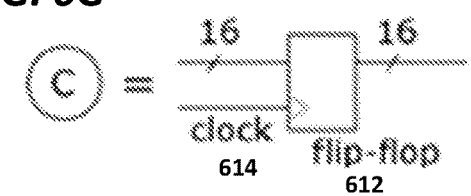

With these considerations in mind, the HBN-RNG scheme can be modified to act as a HBN-PUF, as shown in FIG. 6E. In particular, the following changes are made as compared to the HBN-RNG shown in FIG. 6A:

Replace each node with an XOR LE 608 and a multiplexer 610 that sets the initial state of the ABN to a particular N-bit string (the challenge), as shown in FIG. 6F; and Capture the time series of the network using N-bit register 612 at a rate comparable to its dynamics, then read out the time series using a global clock 614 and select (in a manner defined below) an N-bit response from the transient, as shown in FIG. 6G.

The first change is to make the network challengeable and to prevent self-excitation from the all-0 state by removing the XNOR node. A challenge C is defined to be the N-bit binary string (also referred to herein as "challenge bit string") setting the initial state of the ABN according to some arbitrary but fixed labeling of the nodes. Mathematically, shown by Eqn. (1):

$$C = x(t=0), \quad (1)$$

for an N-bit state x(t) of the ABN at time t=0. By defining challenges to be the initial states of the ABN, an exponentially scaling challenge space is obtained in which the number of possible challenges grows as $2^N$. Specifically, the number of valid challenges $N_{vc}$ is defined to be all possible bit strings of length N that are not steady-states of the ABN. This means we exclude the all-0 or all-1 states for all N, as the asynchronous 3-input XOR remains static in either case. Similarly, for even N the states with alternating 0's and 1's are excluded. Thus, the number of valid challenges is given by Eqn. (2):

$$N_{vc} = \begin{cases} 2^N - 2 & N \text{ odd} \\ 2^N - 4 & N \text{ even} \end{cases}. \quad (2)$$

The second change is to capture the transient behavior of the ABN where it is simultaneously most reliable and unique. This is the point in time at which the FPGA manufacturing variations have decorrelated the network from its initial state sufficiently to act as a "fingerprint" for the circuit. Formally, the HBN-PUF is challenged by setting the initial state of the ABN to C and then allowing it to evolve for a short time when the behavior is still in the transient phase. The N-bit response R of the HBN-PUF to the challenge C is then selected from among the ABN time series by evaluating its bitwise Boolean derivative, defined as Eqn. (3):

$$R = \left.\frac{\delta x}{\delta t}\right|_{t_{opt}} = \left. XOR[x(t), x(t-\tau)] \right|_{t_{opt}}, \quad (3)$$

where XOR[.,.] is the bitwise XOR function and | is used to denote evaluation at a particular value. The time t≥τ is the registered time at which the ABN is stored after applying the challenge, as described below. The optimal time $t_{opt}$ is the time maximizing uniqueness and reliability from among the time series of Boolean derivative states in the transient, as chosen through an optimization routine described below. The choice to use the Boolean derivative is inspired by the XOR procedure for reducing bias in the output bit stream of the HBN-RNG described above. Finally, the number of bits read per challenge is N, and therefore the extractable bits from the design may potentially scale as N $2^N$, resulting in a strong PUF.

The time series of the ABN evolution is collected as follows. The ABN is first set to C at t=0, and subsequently a RESET bit is flipped to 0, allowing the ABN to evolve. The dynamics of the ABN are then registered autonomously in τ≈0.5 ns intervals by passing the RESET signal down a delay line. The delay line consists of sequential pairs of inverter gates, each pair roughly delaying the RESET signal by τ. After each delay, the state of all of the nodes in the network at that time are placed in registers, then later pushed to memory using a global clock. This process ensures the dynamics of the ABN are captured at a timescale comparable to their evolution, as the inverter gate pairs used in the delay line and the LEs of the nodes in the ABN are both close to r, though each varies slightly due to manufacturing differences.

Experimental Procedure

The HBN-PUF is created by coding the design into a hardware programming language (e.g., Verilog hardware description language (HDL)) and using a compiler (e.g., QUARTUS II computer aided design (CAD) software from INTEL CORP. of Santa Clara, California) to compile code with placement and routing chosen automatically by its optimization procedure. $N_{chips}$=10 are then separately programmed with the same .SOF file. Each chip is a DE10-Nano system on a chip (SOC) from TERASIC, INC. of Hsinchu, Taiwan hosting CYCLONE V 5CSEBA6U23I7 FPGAs from INTEL CORP. of Santa Clara, California. This ensures each FPGA instantiates an identical copy of the HBN-PUF described herein (e.g., as shown in FIG. 6E) in both layout and design, meaning the only variations from one PUF instance to another are due to variations in the manufacturing of the FPGAs.

Using custom Python scripts, $N_{distinct}$ unique and randomly selected valid challenges are loaded onto each chip's on-board memory and used to set the initial state of the HBN. The network then evolves for a short time during the transient chaotic phase, the time series is saved to memory, and the PUF is reset to the next challenge.

The entire process is repeated $N_{query}$ times, so that the total number of applied challenges per chip is equal to $N_{distinct} \times N_{query}$. As described below, a majority vote is performed, in which case the response to a given challenge is taken to be the most frequently observed bits from among $N_{votes}$=25 responses to the same challenge. In this way the number of times a challenge is applied is $N_{query} = N_{votes} \times$ $N_{repeat}$ and the number of responses to this challenge following the vote is $N_{repeat}$, so that the total number of CRPs is $N_{distinct} \approx N_{repeat}$. The data of the time series are then read out and used in the analysis described below.

Device Statistics

Standard measures of uniqueness and reliability for the PUF design across multiple chips and for different network sizes are defined and evaluated below. Consistent performance comparable to other state-of-the-art PUFs is found. Results showing the HBN-PUF can doubles as a hardware random number generator are also shown.

BACKGROUND

Let $P \in \mathcal{P}$ be a particular PUF instance P belonging to the set of all PUF instances $\mathcal{P}$ following the design described above. The response R is a random variable $R: S_P \rightarrow \{0,1\}^N$ mapping from the set of all possible physical states $S_P$ of PUF instance P to the set of all binary strings of length N, denoted $\{0,1\}^N$.

Specifically, the response takes as input a particular state $S_{P,C} \in S_P$ of PUF instance P resulting from challenge C. Expressed element wise, this mapping is $S_{P,C} \rightarrow R(S_{P,C})$. To simplify the notation, the response R(P,C) is written as a function of the PUF instance P and the challenge applied to it C, with the tacit understanding that the formal definitions given above hold.

The reliability and uniqueness of P are characterized by studying the distributions of R for various P and C; in other words, how the design performs as a PUF is studied by comparing responses from individual and different instances on a per-challenge basis. To that end, the following standard measures are defined.

Intro-Device and Inter-Device Definitions

Consider two different responses from the same challenge string $C_i$. These responses may result from applying the same challenge string to the same PUF instance two different times $C_{i,j}$ and $C_{i,k}$, or they may result from applying the challenge exactly once to two different PUF instances $P_l$ and $P_m$. The first case will be used to gauge reliability: a single PUF instance should ideally produce identical responses when presented with the same challenge. The second case will be used to gauge uniqueness: two different PUF instances should give responses to the same challenge which, when compared, appear random and uncorrelated. For clarity these indices are summarized:
- $i \in [0, N_{distinct}]$: Distinct challenge;
- $j, k \in [0, N_{repeat}]$: Separate applications of distinct challenge;
- $l, m \in [0, N_{chips}]$: Separate PUF instances.

If each response is taken to be an N-bit string, then the fraction of dissimilar bits between the two responses is denoted as shown by Eqns. (4) and (5):

$$r_{ijk;l} = D[R(P_l, C_{i,j}), R(P_l, C_{i,k})] \div N \quad (4)$$

$$u_{ilm;j} = D[R(P_l, C_{i,j}), R(P_m, C_{i,k})] \div N, \quad (5)$$

where D[.,.] is the Hamming distance (number of differing bits between two N-bit binary strings), $r_{ijk;l}$ (mnemonic 'reliability') is the within-instance (intra or intra-device) fractional Hamming distance between responses for the fixed PUF instance $P_l$ resulting from applications j and k of challenge i. Likewise, $u_{ilm;j}$ (mnemonic 'uniqueness') is the between-instance (inter or inter-device) fractional Hamming distance between responses of PUF instances $P_l$ and $P_m$ resulting from the fixed application j of challenge i.

To obtain distributions of these distances on a per-challenge basis, the pairwise combinations used to construct them are averaged over, and then the remaining indices are further averaged over to obtain mean measures of reliability $\mu_{intra}$ and uniqueness $\mu_{inter}$. Specifically, if $<.>_{(a,b),c}$ indicates the average of a quantity over pairwise combinations (a, b) and remaining indices c, then:

$$\mu_{intra} = \langle r \rangle_{(j,k),l,i}, \quad (6)$$

$$\mu_{inter} = \langle r \rangle_{(l,m),j,i}. \quad (7)$$

To gauge the reliability of an individual chip, then do not average over the instances $P_l$, so that the mean reliability on a per chip basis is $\mu_{intra;l} = <r>_{(j,k),i}$. Note that a time series of N-bit strings representing the time evolution of the network is recorded, so that there exist the above measures at every point in time. Ideally, $\mu_{intra} = 0$ and $\mu_{inter} = 0.5$ for all time. In practice this is not the case, and the response is chosen as the point in time $t_{opt}$ that maximizes $\Delta \mu(t) := \mu_{inter}(t) - \mu_{intra}(t)$, i.e., the point in the transient that is simultaneously most reliable and unique.

Experimental Intro-Device and Inter-Device Statistics

Here we present results for $N_{distinct} = 100$ valid challenges repeated $N_{repeat} = 10$ times each for N=16 and N=256 node networks. Plotted on the lefthand side of FIGS. 7A-7D are the reliability distributions on a per-challenge basis for the least and most reliable chips $<r>_{(j,k)}$, the means of which are the average reliability on a per-chip basis $\mu_{inter;l}$. Plotted on the righthand side of FIGS. 7A-7D are the reliability and uniqueness distributions on a per-challenge basis $<r>_{(j,k),l}$ and $<u>_{(l,m),j}$, the means of which are $\mu_{intra}$ and $\mu_{inter}$ respectively.

Figure 7A:
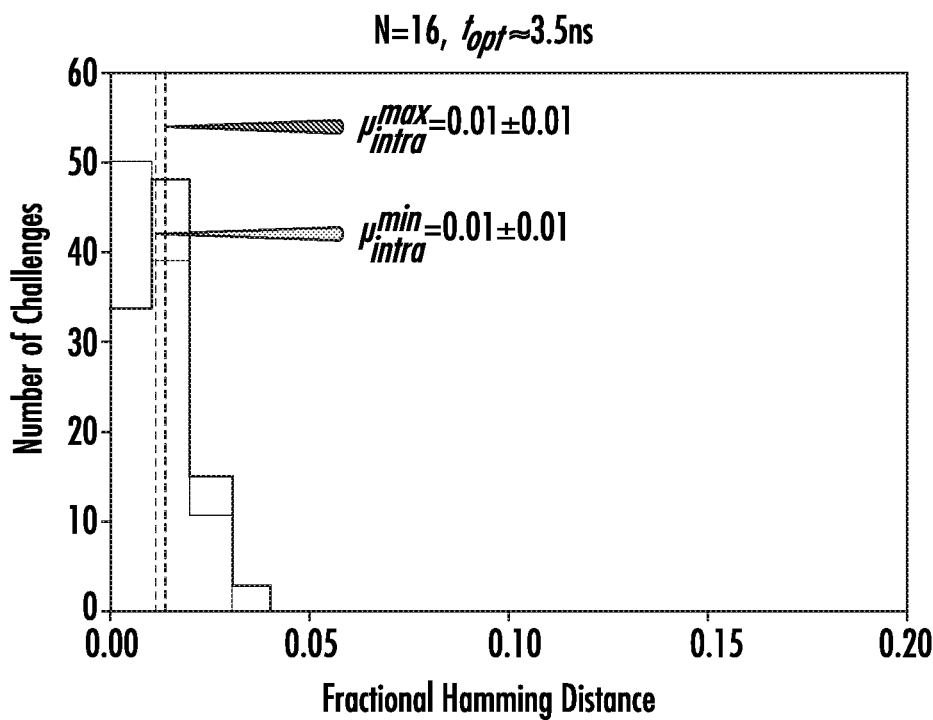
FIGS. 7A-7D are graphs illustrating intra-device and inter-device statistics for HBN-PUFs with 16 and 256 nodes (i.e., N=16 and N=256 PUF instances) as measured at the optimal time for each network size.
Figure 7B:
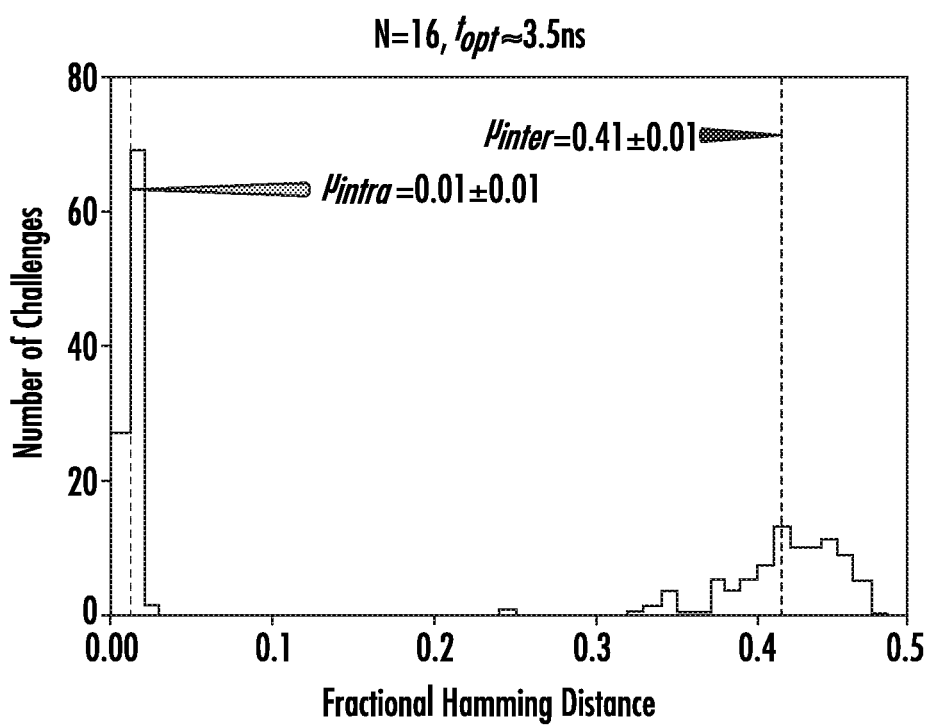
Figure 7C:
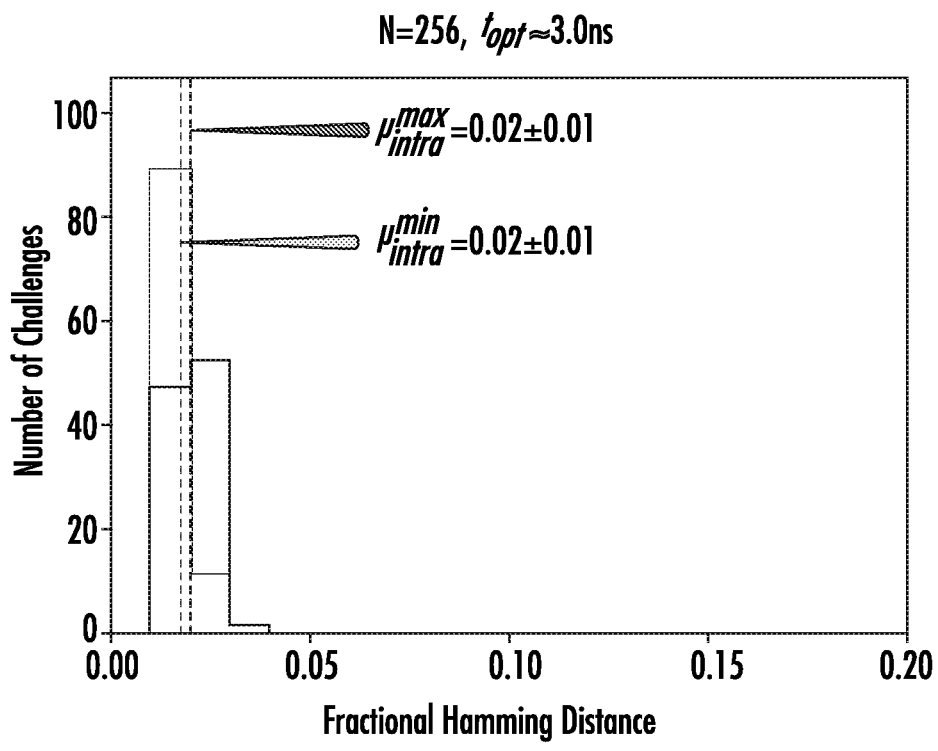
Figure 7D:
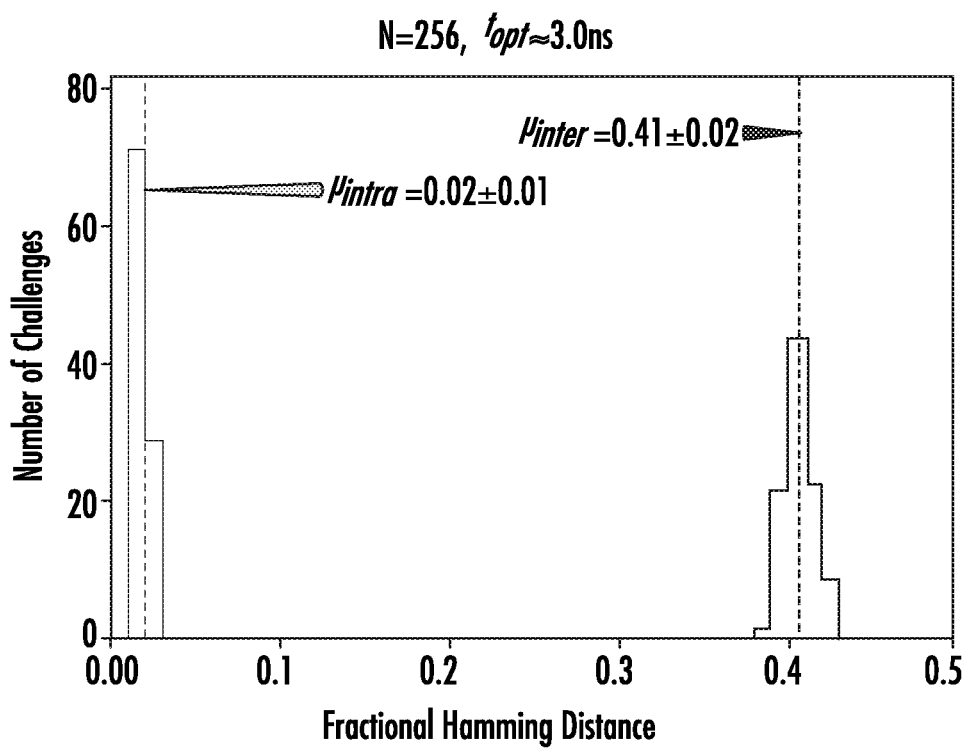

It can be seen from FIG. 7A and FIG. 7C that all chips possess identical reliability to within the given uncertainty for the network sizes tested, meaning that any individual chip is equally as reliable as any other. From FIG. 7B and FIG. 7D, it can be seen that the two distributions are tightly centered and well separated for each network size, indicating the probability of falsely attributing the response of one PUF instance to another is next to zero (low false-positive rate). This means that the HBN-PUF described herein (e.g., as shown in FIG. 6E) is well-suited to authentication purposes.

Furthermore, we see that $\mu_{inter}$ and $\mu_{intra}$ are at most 9% and 2% away from their ideal values of 0.5 and 0, respectively. These errors are further correctable through standard means such as: error correction algorithms, tabulating the least unique and reliable bits during enrollment and removing them from the response, or simply requiring more responses until the probability of a false identification is near zero. Each of these is practical for the HBN-PUF described herein as multiple response bits per challenge are collected very quickly, making authentication tasks simpler and more secure than with single-bit response PUFs. This is because the probability of an adversary correctly guessing, e.g., an N=256 bit response is negligible in comparison to guessing a single bit, in which case a very large number of challenges would be required for authentication. Conversely, very similar distributions as those above are obtained using only a few number of challenges, e.g., $N_{distinct} \sim 10$.

Random Number Generation

Figure 8A:
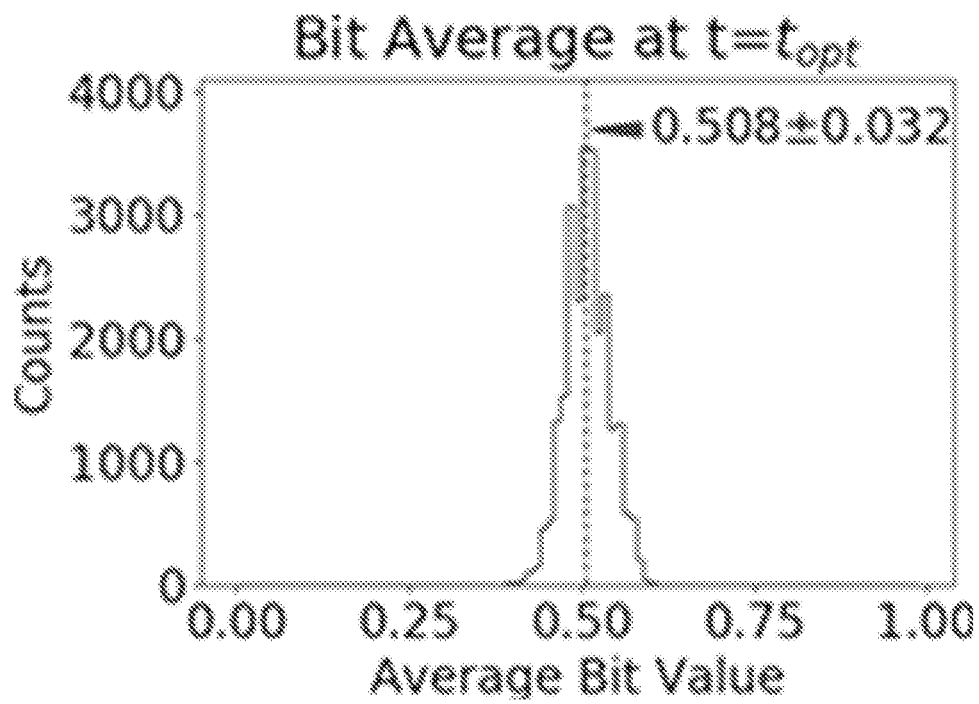
FIGS. 8A and 8B are graphs illustrating average bit value of N=256 node network at time $t=t_{opt}$ (FIG. 8A) and $t=2t_{opt}$ (FIG. 8B). Note the tight center about 0.5 in both cases, indicating a random bit-value distribution at and beyond the optimal time of measurement.
Figure 8B:
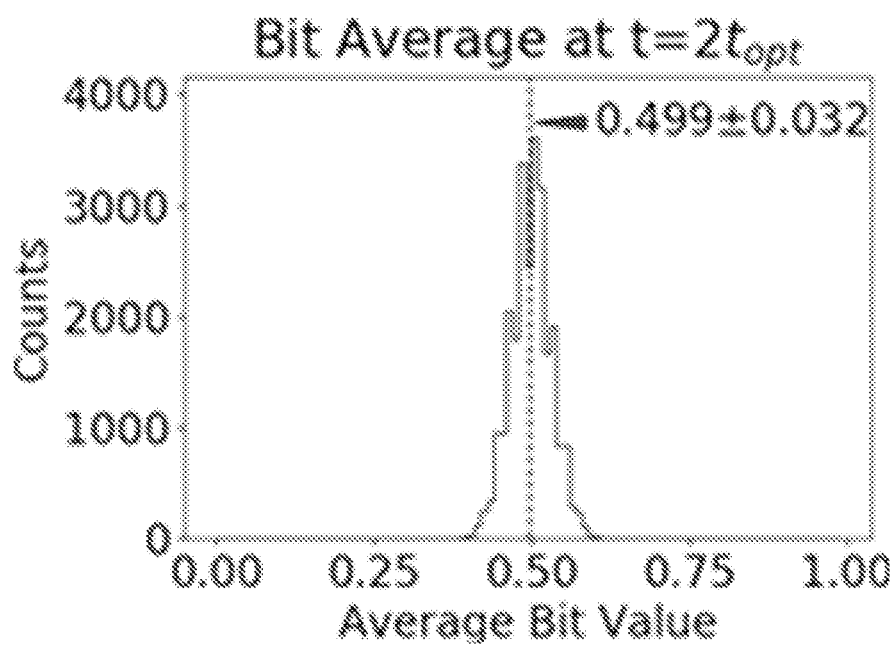

It is shown below that the average bit value of the HBN-PUF responses exhibit tightly centered distributions about 0.5 at late times, suggesting a random quality. Consider the N=256 node network presented above, and let $s_{ijln}$ be the $n^{th}$ bit of the response string s from challenge i, application j, and instance l at a time $t \geq t_{opt}$. FIGS. 8A and 8B plot the distribution of s and its mean for times $t = t_{opt}$ and $t = 2 t_{opt}$ for N=256.

From FIGS. 8A and 8B, the data presents little bias toward 0 or 1. This disclosure contemplates that further testing, such as with the NIST statistical suite [See L. Bassham et al. *SP 800-22 Rev. 1a A Statistical Test Suite for Random and Pseudorandom Number Generators for Cryptographic Applications.* National Institute of Standards and Technology (NIST), 2010.], can be performed as a next step toward validating hardware RNG behavior.

Entropy Analysis

In the security analysis of PUFs, the extractable entropy is of central importance. This quantity is ultimately related to both reliability and uniqueness and provides an upper-bound on the amount of information that can be securely exchanged with a PUF instance [See P. Tuyls et al. Information-theoretic security analysis of physical unclonable functions. In *International Conference on Financial Cryptography and Data Security*, pages 141-155. Springer, 2005]. The extractable entropy is difficult to estimate directly, as it is formed from probability distributions in exponentially high dimensional spaces. Described below are several ways to estimate entropy from limited data.

The process starts by assuming independence between bit pairs in the responses of the HBN-PUF described herein (e.g., as shown in FIG. 6E) and calculating the minimum entropy for various network sizes N. The calculation of the min-entropy scales sub-exponentially with N and thus allows efficient estimation of an upper bound for the entropy of large-N devices. This assumption is then refined by calculating the empirical mutual information between bit pairs, which have been shown to exist in other PUFs [See R. Maes. *Physically unclonable functions.* Springer, 2016]. This yields a more accurate estimate of the entropy in low N devices. The results are interpreted as a lower bound on the entropy of the HBN-PUF described herein. A third entropy measure is presented which acts more tightly as an upper-bound for low N devices. Additionally, these results are summarized, finding an exponential scaling of entropy with network size. In what follows all logarithms are base 2 and the response is chosen at $t_{opt}$.

Minimum Entropy

The min-entropy of a random variable X is defined as Eqn. (8):

$$H_{min}(X) = \log(p_{max}(X)), \tag{8}$$

where $p_{max}(X)$ is the probability of the most likely outcome. If $X = (x_1, x_2, \ldots, x_n)$ is a vector of n independent random variables, then the min-entropy is defined as Eqn. (9):

$$H_{min} = \sum_{i=1}^{n} -\log(p_{max}(x_i)), . \tag{9}$$

In the case of a strong PUF with multiple challenges and a large response space, an ordering of the response bits is needed to make sense of entropy calculations. A natural ordering is to define the response of the i-th node to the j-th challenge as $x_{jN+i}$, where the challenges are ordered lexicographically. This is illustrated in Table 1 for the simple case of N=3. Here, there are only 6 challenges because the trivial all-0 and all-1 challenges are omitted. An illustration of response-bit ordering for N=3, where there are 3×6=18 total bits is shown in Table 1.

TABLE 1

| Challenge | Node 1 | Node 2 | Node 3 |
|---|---|---|---|
| 001 | $x_1$ | $x_2$ | $x_3$ |
| 010 | $x_4$ | $x_5$ | $x_6$ |
| 011 | $x_7$ | $x_8$ | $x_9$ |
| 100 | $x_{10}$ | $x_{11}$ | $x_{12}$ |
| 101 | $x_{13}$ | $x_{14}$ | $x_{15}$ |
| 110 | $x_{16}$ | $x_{17}$ | $x_{18}$ |

Assuming independence of $x_i$, the min-entropy for the HBN-PUF described herein can be readily calculated with Eqn. (9) from empirical estimates of $p_{max}(x_i)$ [See D. Holcomb et al. Power-up sram state as an identifying fingerprint and source of true random numbers. *IEEE Transactions on Computers*, 58(9):1198-1210, 2009; P. Simons et al. Buskeeper PUFs, a promising alternative to d flip-flop PUFs. In 2012 *IEEE International Symposium on Hardware-Oriented Security and Trust*, pages 7-12. IEEE, 2012]. For each $x_i$, the estimate of $p_{max}(x_i)$ is simply the observed frequency of 0 or 1, whichever is larger. To put the entropy calculations into context, the calculations are presented as a fraction of the optimal case. If all of the x, were independent and completely unbiased, i.e., each $x_i$ were equally likely to be 0 or 1, than the min-entropy would be equal to N times the number of valid challenges $N_{vc}$. The min-entropy density is therefore defined as shown by Eqn. (10):

$$\rho_{min} = H_{min}/(NN_{vc}). \tag{10}$$

Due to the exponential scaling of the challenge space $N_{vc}$, these values are not able to be measured using all of the possible valid challenges for N>8, though, as described below, the full challenge space for low N is studied. Thus, assume that the randomly chosen challenges form a representative sample and multiply by the fraction of the unused space to obtain $H_{min}$. Table 2 presents minimum entropy ($H_{min}$) and minimum entropy densities ($\rho_{min}$) for N=8, 16, 32, 64 with $N_{chips}=10$, $N_{distinct}=100$, and $N_{repeat}=100$.

TABLE 2

| N | $H_{min}$ | $\rho_{min}$ |
|---|---|---|
| 8 | $1.1 \times 10^3$ | 0.57 |
| 16 | $5.1 \times 10^5$ | 0.48 |
| 32 | $5.7 \times 10^{10}$ | 0.41 |
| 64 | $5.7 \times 10^{20}$ | 0.48 |

It can be seen from Table 2 that the HBN-PUFs have min-entropy approximately 50% of full min-entropy. For comparison, various standard electronic PUFs have min-entropy between 51% and 99%—see, e.g., Ref. [See R. Maes. Physically unclonable functions. Springer, 2016] for a more complete comparison. The HBN-PUF therefore has min-entropy density comparable to state-of-the-art techniques. Another interpretation of the min-entropy is that it is equal to the number of bits one can securely exchange if an adversary only knows about the biases of the $x_i$. From Table 2, one can exchange $5.6 \times 10^{22}$ bits of information against a naïve adversary. This HBN-PUF uses only 3×64=192 LEs, which is extremely compact compared to other FPGA-based PUF designs, and hence it is possible to easily increase the entropy by increasing the size of the ring.

Joint Entropy

As described above, it is assumed that $x_i$ are independent, though this need not be the case. It is possible that some bits reveal information about others, reducing the entropy. These correlations between bit pairs are studied, first by calculating the mutual information defined by Eqn. (11):

$$I(x_i, x_j) = \sum_{x_i, x_j} p(x_i, x_j) \log\left[\frac{p(x_i, x_j)}{p(x_i)p(x_j)}\right], \quad (11)$$

between all pairs of $x_i$, $x_j$. Unlike min-entropy, the mutual information is difficult to calculate for higher N, so attention is restricted to N=3-8 and the full valid challenge space is used. The mutual information for small N is calculated with $N_{chips}$=10, $N_{chat}$=$N_{vc}$, and $N_{repeat}$=100. For N=7, regions with non-trivial mutual information (>0.05 bits) are shown in FIG. 9.

Figure 9:
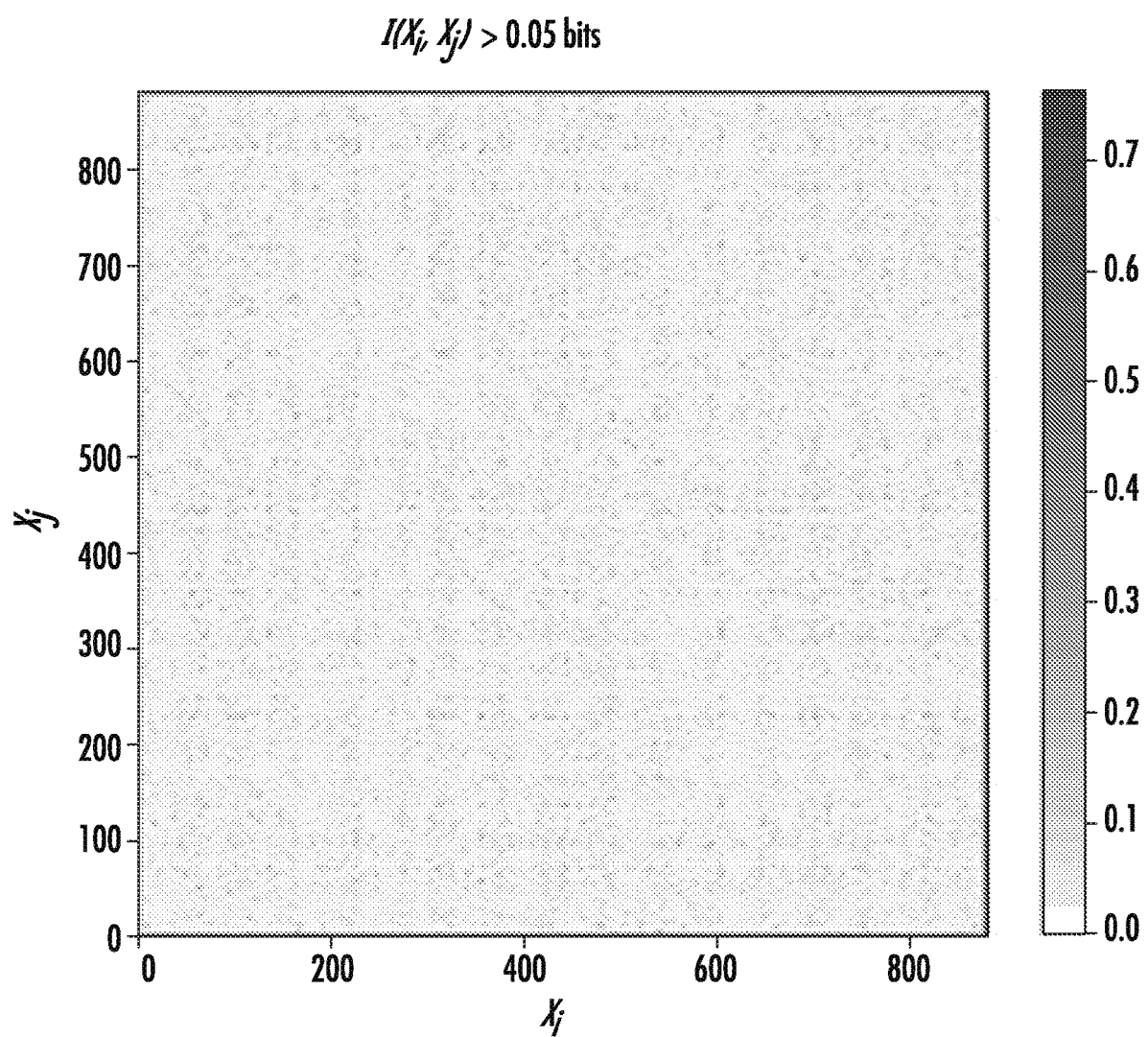
FIG. 9 is a visualization of the regions with high (>0.05 bits) mutual information for an N=7 node network, which make up 0.255% of the total space.

From FIG. 9, it can be seen that that peaks of non-trivial mutual information are sparse in the space of $x_i$, $x_j$ pairs with no obvious structure to the points possessing relatively high information. However, should it exist, an adversary can use knowledge of this structure to more effectively guess response bits, thereby reducing the available entropy. In particular, the entropy is reduced to [See R. Maes. *Physically unclonable functions*. Springer, 2016] as shown by Eqn. (12):

$$H_{joint} = H_{min} - \sum_{i=0}^{n-1} I(x_i, x_{i+1}),$$

where the ordering of the bits is such that the penalty is as large as possible. Calculating the ordering of the bits to maximize the joint information penalty is effectively a traveling salesman problem, which can be solved approximately with a 2-opt algorithm [See B. Chandra et al. New results on the old k-opt algorithm for the traveling salesman problem. *SIAM Journal on Computing*, 28(6):1998-2029, 1999].

Minimum entropy ($H_{min}$), joint entropy ($H_{joint}$), and joint entropy densities ($\rho_{joint}$) for N=3-8 are shown in Table 3. Joint entropy density estimates are similar to many other FPGA-based PUF designs.

TABLE 3

| N | $H_{min}$ | $H_{joint}$ | $\rho_{joint}$ |
|---|---|---|---|
| 3 | 4.6 | 3.5 | 0.19 |
| 4 | 29.8 | 17.6 | 0.37 |
| 5 | 63.5 | 19.0 | 0.13 |
| 6 | 216.2 | 111.3 | 0.31 |
| 7 | 467.9 | 221.0 | 0.25 |
| 8 | 1140.6 | 514.8 | 0.25 |

The resulting entropy estimates are tabulated in Table 3, along with entropy density estimates defined analogously to Eqn. (10). The estimates of the joint-entropy density is, on average, 25% less than the estimates of the min-entropy density. This is lower than other electronic PUF designs, where the joint-entropy estimate is between 2.9% and 8.24% less. See Reference [See R. Maes. *Physically unclonable functions*. Springer, 2016] for a detailed comparison.

Although the existence of non-zero mutual information lowers the amount of information that can be securely exchanged, calculating the mutual information directly is a computationally inefficient task. Such estimates, and therefore such attacks, are difficult to calculate for large N. Three-bit correlations likely exist, but are even more difficult to estimate, so it's unclear that that entropy is much smaller than the joint-entropy estimates above in practice, although a machine-learning attack may reveal such dependencies efficiently [See U. Rührmair et al. Modeling attacks on physical unclonable functions. In *Proceedings of the 17th ACM conference on Computer and communications security*, pages 237-249. ACM, 2010].

Context-Tree Weighting Test

The entropy is estimated through a string compression test below. The results here should be understood as an upper-bound for the true entropy, especially for larger N. In particular, the context tree weighting (CTW) algorithm [See F. Willems et al. The context-tree weighting method: basic properties. *IEEE Transactions on Information Theory*, 41(3):653-664, 1995] is considered.

The CTW algorithm takes a binary string called the context and forms an ensemble of models that predict subsequent bits in the string. It then losslessly compresses subsequent strings into a codeword using the prediction model. The size of the codeword is defined as the number of additional bits required to encode the PUF instance's challenge-response behavior. If the context contains information about a subsequent string, then the codeword will be of reduced size.

In the case of PUFs, the codeword length has been shown to approach the true entropy of the generating source in the limit of unbounded tree depth [See T. Ignatenko et al. Estimating the secrecy-rate of physical unclonable functions with the context-tree weighting method. In 2006 *IEEE International Symposium on Information Theory*, pages 499-503. IEEE, 2006]. However, the required memory scales exponentially with tree depth, so it is not computationally feasible to consider an arbitrarily deep tree in the CTW algorithm. Instead, the tree depth is varied up to D=20 to optimize the compression.

A CTW compression is performed as follows:

Step 1: Collect data for N=3-8 HBN-PUFs with $N_{chips}$=10, $N_{distinct}$=$N_{vc}$, and $N_{repeat}$=1.

Step 2: Concatenate the resulting measurements for all but one HBN-PUF instance into a one-dimensional (1D) string of length $(N_{chips}-1)N_{vc}N$ to be used as context.

Step 3: Apply the CTW algorithm to compress the measurements from the last HBN-PUF with the context, using various tree depths to optimize the result.

Repeat steps 2-3, omitting measurements from a different HBN-PUF instance, until all HBN-PUFs have been compressed.

The results of this compression test are presented in Table 4. The final entropy estimate is the average codeword length from all of the compression tests described above. If the behavior of the $N_{chips}-1$ PUF instance can be used to predict the behavior of the unseen instance, then the PUFs do not have full entropy.

Entropy ($H_{CTW}$) and entropy density ($\rho_{CTW}$), as estimated from the CTW compression test is shown in Table 4. Note that this is an upper-bound of the true entropy due to the bounded tree-depth is shown in Table 4.

TABLE 4

| N | $H_{CTW}$ | $\rho_{CTW}$ |
|---|---|---|
| 3 | 19.4 | 1.08 |
| 4 | 47.4 | 0.99 |
| 5 | 148.6 | 0.99 |
| 6 | 357.9 | 0.99 |
| 7 | 807.9 | 0.92 |
| 8 | 1952.2 | 0.97 |

Consistent with the expectation that this is an upper-bound estimate, the entropies are all larger than those calculated with the joint-entropy test described below. Most of the PUF data is resistant to compression, particularly those with higher N, although it is likely the case that higher N require a deeper tree to compress. These results are again similar to studies on other FPGA-based PUFs, which find CTW compression rates between 49% and 100% [See S. Katzenbeisser et al. PUFs: Myth, fact or busted? a security evaluation of physically unclonable functions (PUFs) cast in silicon. In *International Workshop on Cryptographic Hardware and Embedded Systems*, pages 283-301. Springer, 2012].

Entropy Summary

Figure 10:
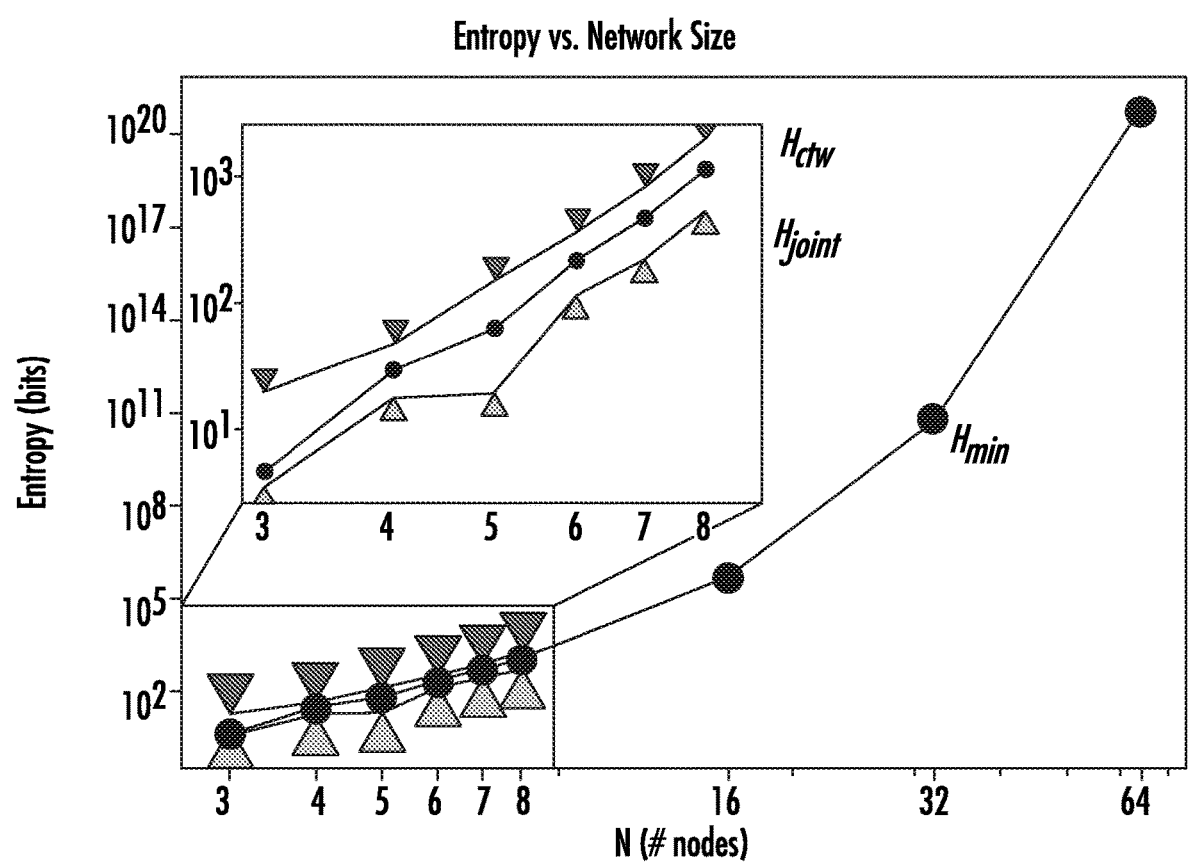
FIG. 10 is a graph illustrating a summary of the entropy results. The $H_{min}$ curve suggests exponential growth. All three curves are reasonably close within the N=3-8 window.

Three different statistical tests to estimate the entropy in the HBN-PUFs are described above. Two of the tests are computationally intensive and only performed on HBN-PUFs of size N=3-8. One is more easily scalable, which was evaluated for N up to 64. To better understand these estimates as a function of N and resource size, these three estimates are shown in FIG. 10.

The $H_{CTW}$ estimate yields the most entropy, followed by $H_{min}$ and $H_{joint}$. This is expected because $H_{CTW}$ is an upper-bound estimate, while $H_{joint}$ is equal to $H_{min}$ with a penalty term determined by mutual information. Nonetheless, all three estimates are reasonably close, particularly on the scale in FIG. 10. Further, the functional form of $H_{min}$ is convex on a log-log scale, suggesting exponential growth with N.

These results suggest that HBN-PUFs described herein (e.g., as shown in FIG. 6E) are not only strong in the sense that their challenge space is exponentially large in resource size, but that their entropy is exponentially large as well. This is important distinction because, for most security applications, a challenge-response pair that is knowable by an adversary is of no use. Many previously reported strong PUFs have been shown explicitly to be susceptible to model-building attacks [See U. Rührmair et al. Modeling attacks on physical unclonable functions. In *Proceedings of the 17th ACM conference on Computer and communications security*, pages 237-249. ACM, 2010].

Chaos and Resilience to Machine Learning

Chaotic systems are defined by their extreme sensitivity to initial conditions. Slight perturbations to a chaotic system will lead to wildly diverging long-term behavior. For this reason many machine learning platforms have difficulty predicting the behavior of chaotic systems past a characteristic timescale known as a Lyapunov time, a result which extends to machine learning attacks on PUFs [See L. Liu et al. Lorenz chaotic system-based carbon nanotube physical unclonable functions. *IEEE Transactions on Computer-Aided Design of Integrated Circuits and Systems*, 37(7): 1408-1421, 2018]. The Lyapunov time of the HBN-PUF described herein (e.g., as shown in FIG. 6E) is calculated experimentally and with a simulation, showing that it is chaotic. The results from PUFmeter [See F. Ganji et al. Pufmeter a property testing tool for assessing the robustness of physically unclonable functions to machine learning attacks. IEEE Access, 7:122513-122521, 2019] are presented below. PUFmeter is a third-party PUF-specific machine-learning platform that failed to learn the behavior of the HBN-PUF described herein.

Lyapunov Exponent

The Lyapunov exponent of a system is a measure of the rate at which two nearby points in phase space diverge. Let z(t) be the separation of two trajectories as a function of time, and let z(0) be small. Then $|z(t) \approx |z(0)| \exp \lambda t$, where $\lambda$ is the Lyapunov exponent. A spectrum of $\lambda$'s is obtained for differently orientated initial separations. However, the maximum $\lambda$ will usually dominate with time, and for this reason it is used as an indicator of chaos: if the maximum $\lambda$ is positive, the trajectories will diverge exponentially, and the system is usually said to be chaotic.

Maximum Lyapunov Exponent Calculation

The maximum Lyapunov exponent is calculated by extending the method of R. Zhang et al. Boolean chaos. *Physical Review E*, 80(4), October 2009 to N-bit responses. Here, the Boolean distance between the time series of two N-bit responses x(t) and y(t) to the same challenge is defined by Eqn. (13):

$$d(t) = \frac{1}{T} \int_{t}^{t+T} \frac{1}{N} D[x(t_0 + t'), y(t_0 + t')] dt', \tag{13}$$

where T is a window of fixed length, and to is the first time at which d=0, i.e., to is the first time at which the two time series differ by at least 1 bit within a window of length T. Note that, because d(t) is a Boolean metric for separations in phase space, the average of its logarithm over time in the linear regime is λ.

The average logarithm of the Boolean distance of each time series segment is therefore computed over all pairwise combinations of repeated responses to a given challenge, and again averaged over all challenges, to obtain $<\ln(d(t))>_{(j,k),i}$ following the index convention described above, or $<\ln d>$ for short. By fitting $<\ln d>$ versus t to a straight line, the estimate of the maximum Lyapunov exponent λ is obtained. This is done both experimentally and by simulating responses from the same challenges using a mathematical model.

Mathematical Model of the PUF

The PUF dynamics are modeled using a system of coupled first order differential equations given by Eqn. (14):

$$\tau_i \dot{x}_i(t) = -x_i(t) + f(N_G(i)), \tag{14}$$

where $x_i(t)$ is the continuous state of node i at time t taking values between 0 and 1, $\tau_i$ is the characteristic rise/fall time of this node, f is the continuous version of the 3-input XOR function, and $N_G(i)$ is the list of all nodes connected to node i, i.e., its neighborhood. Here $N_G(i)$ is restricted to itself and its two neighbors in the ring, and f is defined as by Eqn. (15):

$$f(x,y,z) = \theta(1+\tanh(a_x(x-0.5)\tanh(a_y(y=0.5))\tanh(a_z(z-0.5))), \tag{15}$$

where θ(w) is a threshold function representing the transition of a continuous signal to a Boolean value. θ(w) is defined by Eqn. (16):

$$\theta(w) = (1+\tan h(a_w(w-0.5))/2, \tag{16}$$

where the $a_i$'s are "squeezing" parameters, here all chosen to be a=20, and $\tau_i=0.5$ was chosen for all nodes. The initial states were set to the challenge values with a perturbation chosen between [0, 0.05] to prevent identical simulations. They were then integrated numerically and decimated and Booleanized to match their experimental counterparts. The Lyapunov exponent was then calculated for each as shown in FIG. 11.

Maximum Lyapunov Exponent Results

Figure 11:
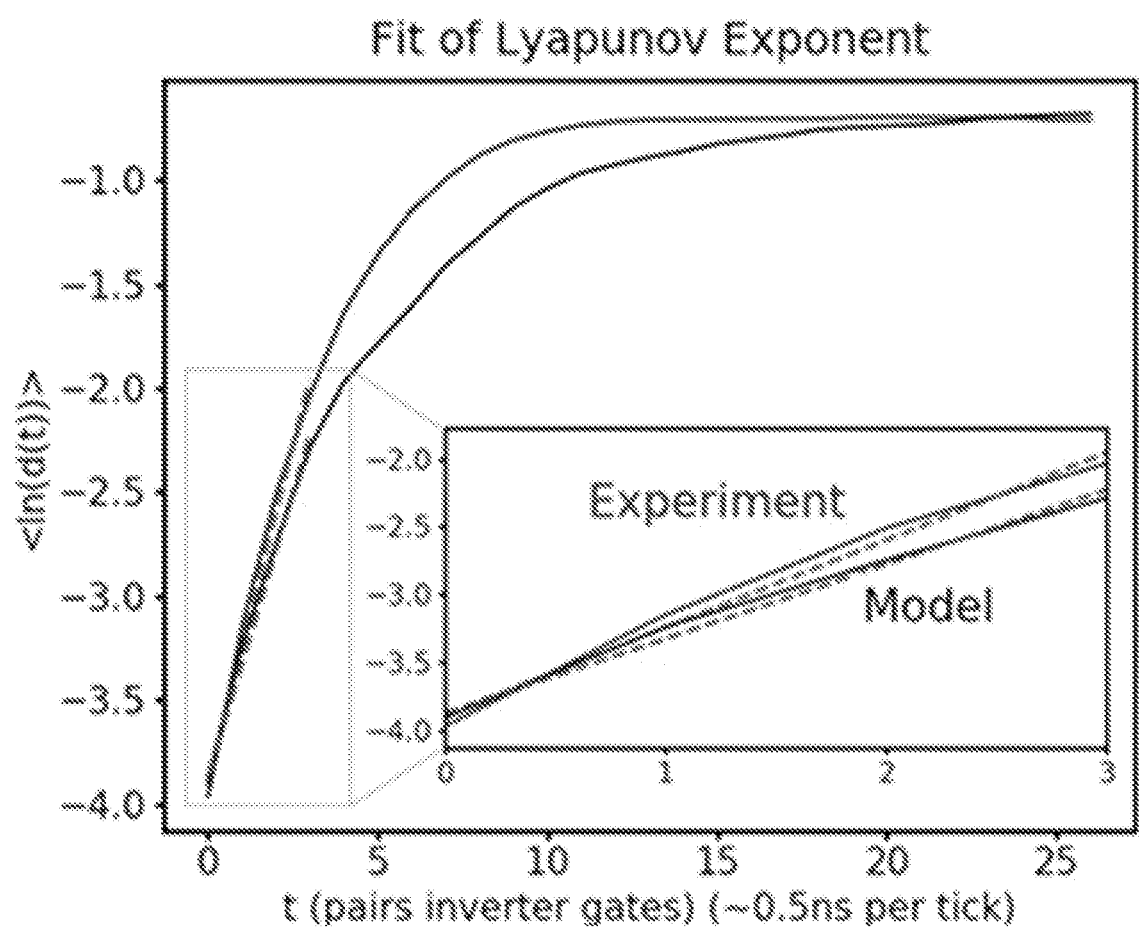
FIG. 11 is a plot of maximum Lyapunov exponent for experiment and model data having N=16 and T=3τ with fits $\lambda_{Experiment}=0.64\pm0.23\ \tau^{-1}$ and $\lambda_{Model}=0.55\pm0.31\ \tau^{-1}$. Note slope positivity, indicating chaos, and convergence to ln(0.5)=−0.693 at late times, indicating complete decorrelation between time series.

As can be seen from FIG. 11, λ>0 for both experiment and model data. This suggests that both the experimental circuit and its theoretical model exhibit chaos. Additionally, the Lyapunov time $t_L=1/\lambda$ is comparable to the optimal response readout time $t_{opt}$, implying that the optimal response time follows the transition into chaos.

Machine Learning Attack with PUFMeter

PUFmeter [See F. Ganji et al. Pufmeter a property testing tool for assessing the robustness of physically unclonable functions to machine learning attacks. *IEEE Access*, 7:122513-122521, 2019] is a recently designed third-party machine learning platform used to assess the security of a PUF. It uses probably approximately correct learning and k-junta functions to attempt to learn the challenge-response behavior of a given PUF, and indicates if a PUF is theoretically susceptible to various types of attacks. Due to the fact that PUFmeter searches the entire valid challenge space $N_{vc}$, the testing was restricted here to an N=16 node network. Furthermore, the theory behind PUFmeter is based upon single-bit responses. For this reason, PUFmeter was used to test an individual bit of the responses, as well as the XOR of our entire response string. These results are presented in Table 5.

Table 5 shows N=16 node PUF machine-learning attack results using PUFmeter, with internal parameters $\delta=0.01$ and $E=0.05$ governing the probability thresholds for the analysis. The result $\kappa=0$ indicates a failure of PUFmeter to model the HBN-PUF described herein (e.g., as shown in FIG. 6E).

TABLE 5

| Response Bit | Noise Upper Bound | Average Sensitivity | Noise Sensitivity | κ |
|---|---|---|---|---|
| XOR | 0.47 | 0.26 | 0.25 | 0 |
| 0th | 0.47 | 0.38 | 0.22 | 0 |

Here κ is the minimum number of Boolean variables usable by PUFmeter to predict the response to a given challenge; since $\kappa=0$, PUFmeter was unable to model the behavior of the HBN-PUF. The noise upper bound, average sensitivity, and noise sensitivity are used to gauge the theoretical bounds for which types of attacks are expected to be possible. From these, PUFmeter indicated that the HBN-PUF may be susceptible to a Fourier-based attack.

Taken together with the exponential entropy scaling and chaotic nonlinear dynamics, the failure of PUFmeter to model the HBN-PUF described herein suggests that the behavior of the HBN-PUF is likely to be resilient to machine learning attacks.

Temperature Variation

Temperature variation is an important practical concern when comparing PUFs indifferent environmental conditions or over long operating times [See S. Mathew et al. 16.2 a 0.19 pj/b pvt-variation-tolerant hybrid physically unclonable function circuit for 100% stable secure key generation in 22 nm CMOS. In 2014 *IEEE International Solid-State Circuits Conference Digest of Technical Papers (ISSCC)*, pages 278-279. IEEE, 2014]. The temperature variation of the HBN-PUF described herein is assessed for two network sizes, N=16 and N=256, by loading $N_{chips}=10$ DE-10-Nano's into an environmental test chamber facility capable of controlling humidity and temperature conditions over a wide range.

For these tests, the temperature is first increased to 55° C. and the humidity purged to <5% toremoveexcessmoistureandpreventcondensationatlowertemperatures. Next, the temperature is lowered in 10° C. increments to a final temperature T=15° C. At each temperature, the chamber is allowed to reach equilibrium as indicated by a digital display, typically within 10 minutes. Then, the boards are queried with $N_{distinct}=50$ and $N_{repeat}=50$ challenges.

The metric $\Delta\mu(t)=\mu_{inter}(t)-\mu_{intra}(t)$ described above is calculated at each temperature for both network sizes. This quantity demonstrates the performance of each PUF when compared to others at the same temperature. Additionally, at each temperature the deviation of an HBN-PUF with respect to itself at 25° C. was calculated. This is a quantity denoted as $\mu_{intra;25}$° C. This measure is equivalent to considering an individual chip as consisting of different instances—one for each temperature. It is calculated at each temperature by comparing responses to those generated at 25° C., then averaging over all challenges and overall chips (individual chips exhibited similar values). These plots are presented in FIGS. 12A-12D as a function of t, the number of inverter gates after which the response is registered. Each curve is a separate temperature.

Figure 12A:
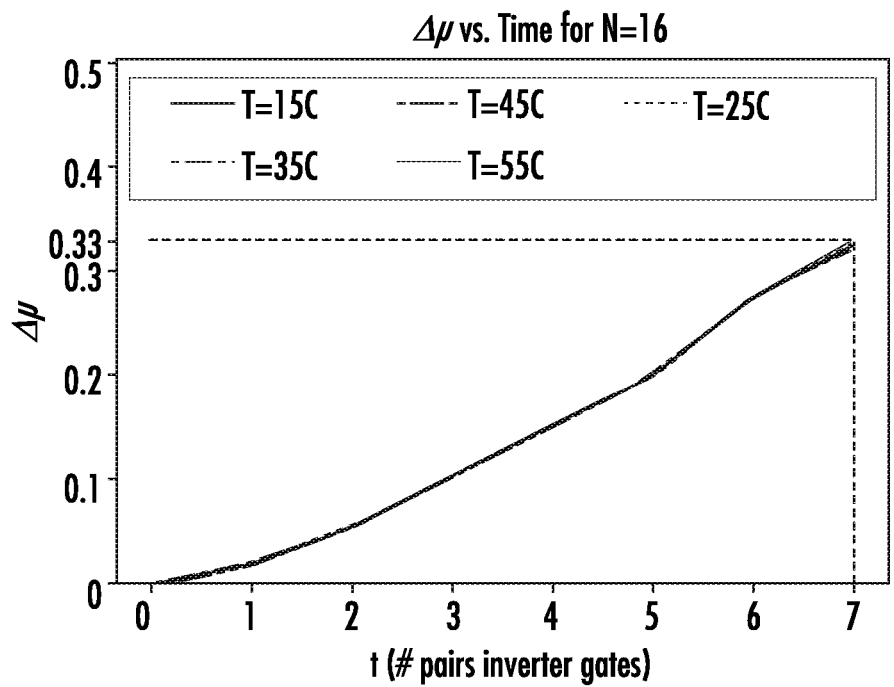
FIGS. 12A-12D are graphs illustrating performance and variation of N=16 and N=256 node networks. Dotted lines indicate optimal time of measurement.
Figure 12B:
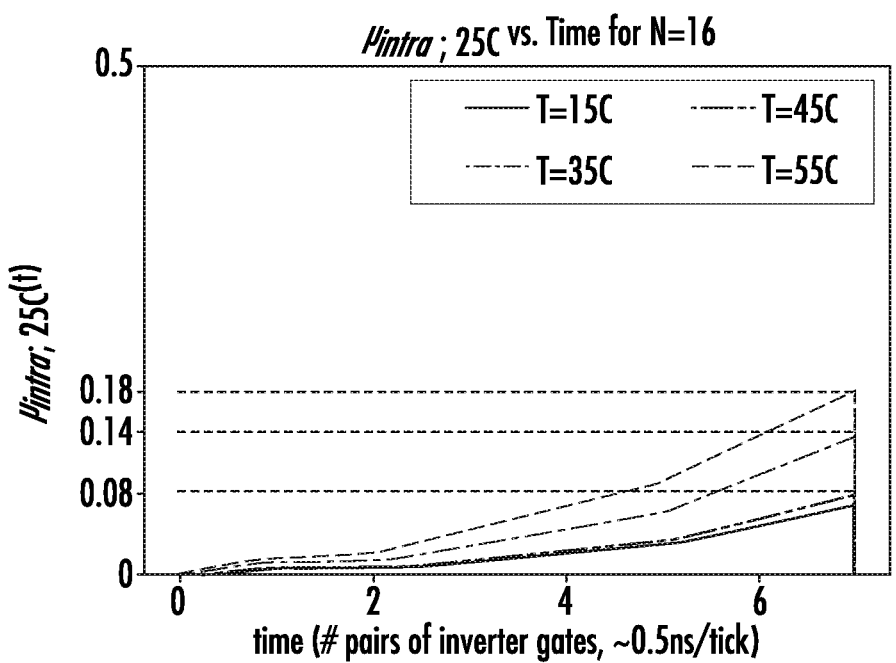
Figure 12C:
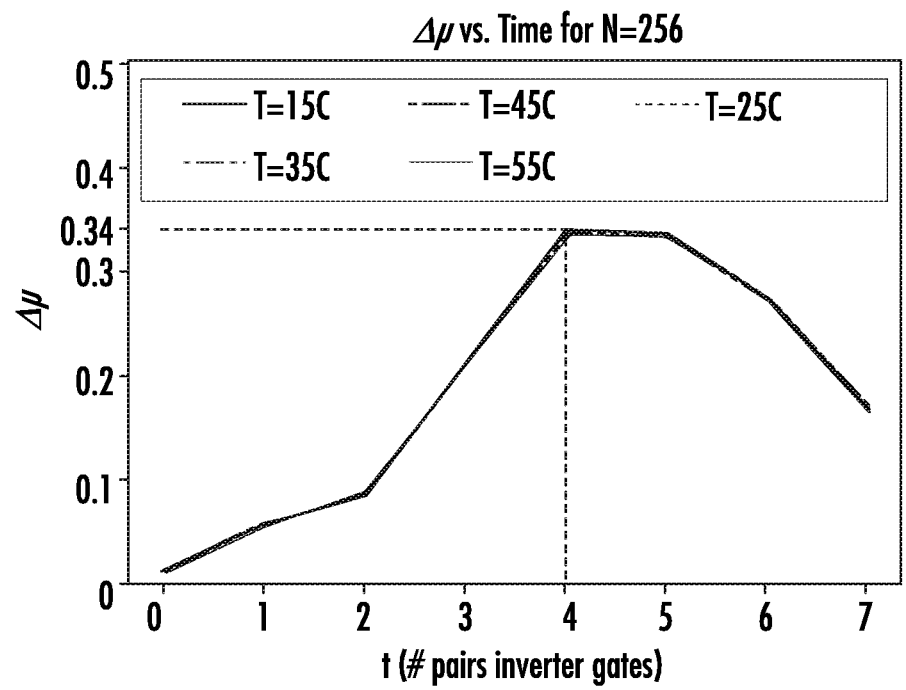

As can be seen from the FIG. 12A and FIG. 12C, for both network sizes the optimal time of measurement $t_{opt}$ and performance metric $\Delta\mu$ are observed to remain constant as temperature changes, indicating that HBN-PUF instances perform equally well when compared to each other at equivalent temperatures.

Figure 12D:
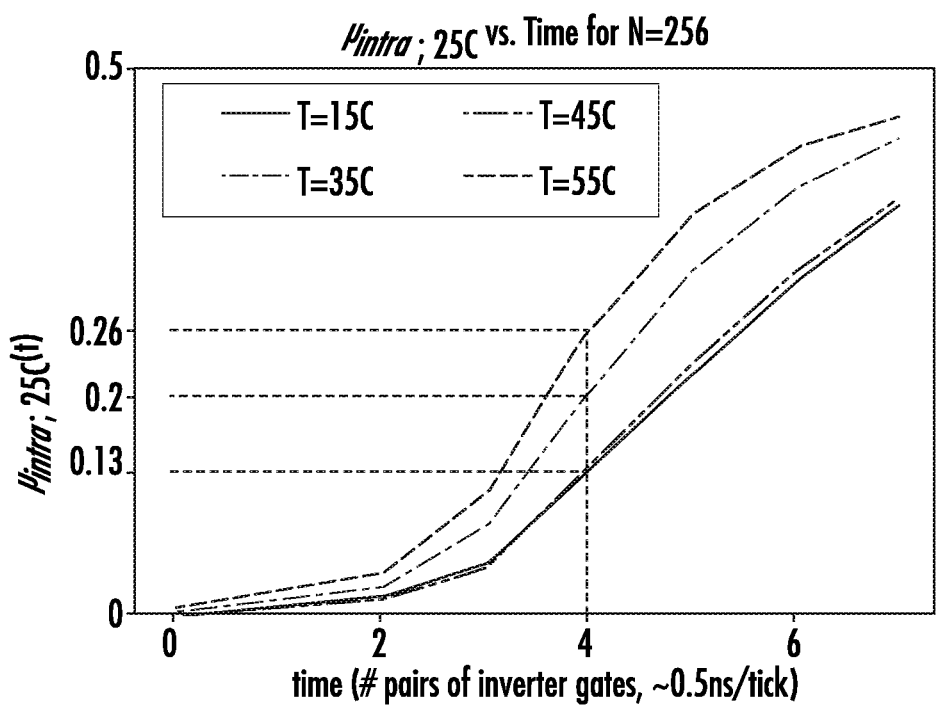

From FIG. 12B and FIG. 12D it can be seen that the responses of a given HBN-PUF instance do not vary significantly from themselves at early times when the temperature is changed. As time progresses however, the responses of a given instance begin to diverge as compared to those at room temperature, appreciably so for the 256 node network shown above. This can be understood as a consequence of thermal fluctuations flipping individual bits, which go on to perturb the system exponentially as time passes. Depending on application, it may be useful to store classes of responses at different times or temperatures, and indicate within the response which class to compare to.

This disclosure contemplates using Muller gates, or C-gates, to improve temperature stabilization. It is known that Muller gates, or C-gates, are useful for temperature stabilization in asynchronous PUFs [See S. Gujja. *Temperature Variation Effects on Asynchronous PUF Design Using FPGAs*. University of Toledo, 2014]. Accordingly, the HBN-PUF described herein may be modified to include Muller gates serving to stabilize individual bit flips associated with thermal fluctuations. Other potential temperature stabilization techniques include optimizing the layout and synthesis of PUFs on the FPGA with respect to temperature, as well as post-processing error correction schemes described herein.

CONCLUSION

The results above show that HBN-PUFs exhibit strong measures of reliability and uniqueness, with inter-device and intra-device statistics that are close to ideal and have tight distributions. This suggests HBN-PUFs are useful for device authentication purposes. Additionally, by virtue of their N-bit responses, HBN-PUFs require fewer challenges for authentication compared to single-bit response PUFs. In combination with the exponentially growing size of the challenge-space with network size, this makes HBN-PUFs attractive for both authentication and security, as it would take longer than the lifetime of the universe to query every challenge for, e.g., an N=256 node network, even at nanosecond intervals.

The results above also show that various entropy estimates suggest HBN-PUF entropy scales exponentially with network size, yielding significantly more entropy and using less hardware than other PUF designs. This means HBN-PUFs constructed from on the order of hundreds of LEs can efficiently store trillions or more independent cryptographic keys in their physical structure using a commercially available FPGA, which has memory for even larger designs than those considered here—for example, an N=1024 node network is easily realizable within memory constraints.

Furthermore, HBN-PUFs appear to exhibit chaotic dynamics and a resilience to machine-learning, in contrast to similar PUFs such as ring oscillators.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An integrated circuit (IC) chip, comprising:
    a physically unclonable function (PUF) comprising a hybrid Boolean network, wherein the hybrid Boolean network includes a first plurality of electronic devices, wherein each electronic device of the hybrid Boolean network is configured to implement a Boolean operation and includes clocked and un-clocked electronic devices; and
    an auxiliary circuit, wherein the auxiliary circuit is configured to introduce a time delay and includes a second plurality of electronic devices, wherein each electronic device of the auxiliary circuit is configured to implement a copy operation, wherein the auxiliary circuit is configured to receive a transient response enable signal, and wherein the transient response enable signal is a transient response bit string used to provide cybersecurity to authenticate a device.

2. The IC chip of claim 1, wherein a duration of the time delay is related to a characteristic time scale of the hybrid Boolean network.

3. The IC chip of claim 1, wherein each electronic device of the auxiliary circuit is configured to implement a Boolean operation.

4. The IC chip of claim 3, wherein the auxiliary circuit comprises a plurality of pairs of series-connected inverter gates.

5. The IC chip of claim 1, wherein the hybrid Boolean network is configured as a modified random number generator.

6. The IC chip of claim 1, further comprising a substrate, wherein the hybrid Boolean network and the auxiliary circuit are disposed on the substrate.

7. The IC chip of claim 6, wherein the hybrid Boolean network and the auxiliary circuit are located in close physical proximity to each other on the substrate.

8. The IC chip of claim 6, wherein the hybrid Boolean network and the auxiliary circuit are located adjacent to one another on the substrate.

9. The IC chip of claim 1, further comprising a plurality of PUFs, each PUF comprising a respective hybrid Boolean network.

10. The IC chip of claim 9, further comprising a combiner circuit configured to combine respective outputs of each of the PUFs.

11. The IC chip of claim 10, wherein the combiner circuit comprises a PUF.

12. The IC chip of claim 1, wherein the IC chip is a field-programmable gate array (FPGA).

13. The IC chip of claim 1, wherein the IC chip is an application-specific IC (ASIC) chip.

14. The IC chip of claim 1, further comprising a register, wherein the register is configured to receive the transient response enable signal via the auxiliary circuit.

15. The IC chip of claim 14, wherein the register is configured to capture a response of the PUF.

* * * * *